United States Patent
Kukita et al.

(10) Patent No.: US 11,720,232 B2
(45) Date of Patent: Aug. 8, 2023

(54) TERMINAL DEVICE AND PROGRAM

(71) Applicant: DAIKIN INDUSTRIES, LTD., Osaka (JP)

(72) Inventors: Tomomi Kukita, Osaka (JP); Daisuke Satou, Osaka (JP); Tatsuya Shouji, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/904,152

(22) PCT Filed: Feb. 15, 2021

(86) PCT No.: PCT/JP2021/005456
§ 371 (c)(1),
(2) Date: Aug. 12, 2022

(87) PCT Pub. No.: WO2021/177009
PCT Pub. Date: Sep. 10, 2021

(65) Prior Publication Data
US 2023/0069657 A1 Mar. 2, 2023

(30) Foreign Application Priority Data
Mar. 3, 2020 (JP) .................................. 2020-035934

(51) Int. Cl.
*G06F 3/0482* (2013.01)
(52) U.S. Cl.
CPC .................................. *G06F 3/0482* (2013.01)
(58) Field of Classification Search
CPC .................................................. G06F 3/0482
See application file for complete search history.

(56) References Cited

U.S. PATENT DOCUMENTS 10,542,161 B2 * 1/2020 Tano .................... H04N 1/0044
11,405,543 B2 * 8/2022 Zass ...................... H04N 23/90
(Continued)

FOREIGN PATENT DOCUMENTS

| CN | 109151300 | 1/2019 |
|---|---|---|
| JP | 2003-296346 | 10/2003 |

(Continued)

OTHER PUBLICATIONS

International Preliminary Report on Patentability for PCT/JP2021/005456 dated Sep. 15, 2022.
(Continued)

*Primary Examiner* — Anil K Bhargava
(74) *Attorney, Agent, or Firm* — IPUSA, PLLC

(57) ABSTRACT

A terminal device and a program that can reduce the operation load at a construction site, are provided. The terminal device is configured to capture an image of a construction status of a device installed at a plurality of locations, the terminal device including an imaging unit configured to capture the image of an imaging target; an imaging instruction acquiring unit configured to acquire an imaging instruction given by a user to the imaging unit; a display unit configured to display candidates of each of a plurality of kinds of construction target information to be associated with the image that the user is to capture; and a selecting unit configured to select, according to the user's instruction, a candidate from among the candidates of each of the plurality of kinds of the construction target information displayed on the display unit, wherein when the candidate is selected at the selecting unit, a candidate linked to the selected candidate is displayed on the display unit.

7 Claims, 19 Drawing Sheets

(56) References Cited

U.S. PATENT DOCUMENTS

| | | | | |
|---|---|---|---|---|
| 2018/0012125 A1* | 1/2018 | Ladha | ................... | G01S 17/89 |
| 2018/0174250 A1* | 6/2018 | Faulkner | ............... | G06F 3/0483 |
| 2018/0373935 A1* | 12/2018 | Harada | ............... | H04N 5/2621 |
| 2020/0410209 A1* | 12/2020 | Zass | ..................... | G06F 16/538 |
| 2021/0089800 A1* | 3/2021 | Inamoto | .............. | H04N 23/698 |

FOREIGN PATENT DOCUMENTS

| | | |
|---|---|---|
| JP | 2014-157596 | 8/2014 |
| JP | 2016-012201 | 1/2016 |
| JP | 2017-182546 | 10/2017 |

OTHER PUBLICATIONS

International Search Report for PCT/JP2021/005456 dated May 11, 2021.

\* cited by examiner

| ITEM | CONTENT |
|---|---|
| COMPLETION BOOK | |
| 1 | COVER |
| 2 | DEVICE DELIVERY DOCUMENT |
| 3 | INSTRUCTION MANUAL |
| 4 | COMPLETION DRAWING |
| 5-1 | AIR CONDITIONER TEST OPERATION TABLE |
| 5-2 | AIRTIGHTNESS TEST RESULT TABLE |
| 5-3 | WATER FLOW TEST RESULT TABLE |
| 5-4 | AIRFLOW VOLUME MEASUREMENT TEST COMPARISON TABLE |
| 6 | CONSTRUCTION PHOTOGRAPH LEDGER |
| 7 | FACILITY MANAGEMENT LEDGER |
| 8 | GUARANTEE FORM |
| 9 | MAINTENANCE CONTACT LIST |

FIG.4
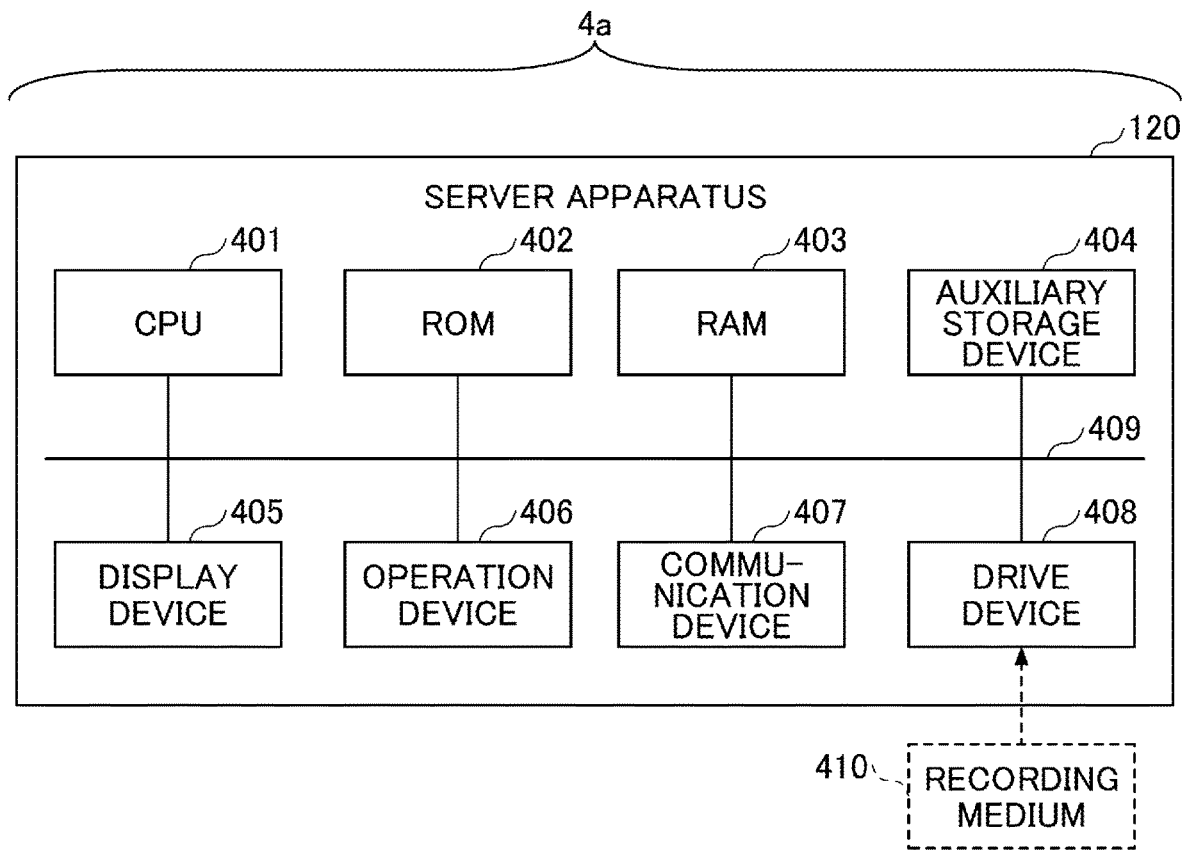
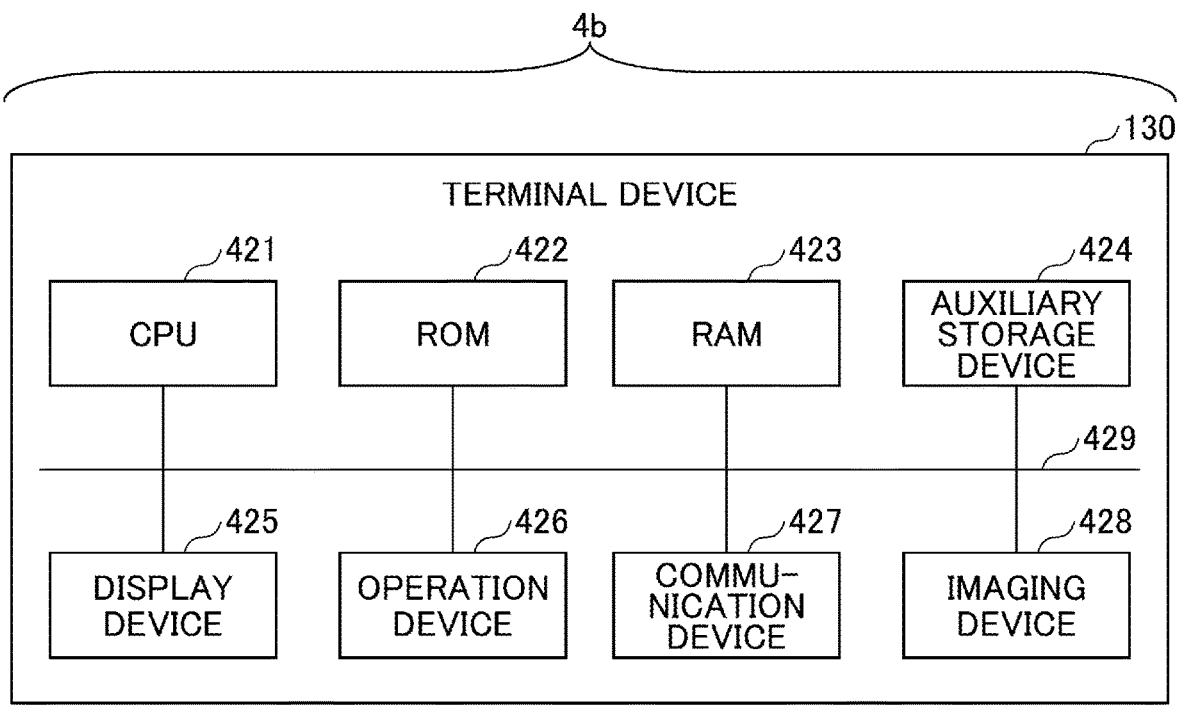

FIG.12A 1210 (12a-1) CONSTRUCTOR

| CONSTRUCTOR ID | CONSTRUCTOR NAME | ADDRESS | CONTACT | CONSTRUCTION SUPERVISOR | USER ID | PASSWORD |
|---|---|---|---|---|---|---|
| | CONSTRUCTOR P | | | | | |
| | CONSTRUCTOR Q | | | | | |

1220 (12a-2) CASE AND PROPERTY INFORMATION

| CASE NAME | CASE ID | PROPERTY NAME | COMMISSION SOURCE | PERSON IN CHARGE OF CASE | DETAILED CASE INFORMATION | CONTRACT CONSTRUCTOR |
|---|---|---|---|---|---|---|
| α | | AAA | | | | CONSTRUCTOR P |
| α | | BBB | | | | CONSTRUCTOR P |

FIG.12B

LOCATION AND DEVICE INFORMATION
(CASE NAME=α, PROPERTY NAME=AAA)

| LOCATION AND DEVICE Gr | Gr1 | Gr2 | Gr3 | ... | GrX |
|---|---|---|---|---|---|
| FLOOR | NORTH BUILDING FIRST FLOOR | NORTH BUILDING FIRST FLOOR | NORTH BUILDING FIRST FLOOR | ... | NORTH BUILDING EAST SIDE OUTDOORS |
| ROOM/ZONE | GRADE 1 CLASS 1 | GRADE 1 CLASS 2 | HOME ECONOMICS ROOM | ... | OUTDOOR UNIT INSTALLATION PLACE |
| LOCATION | ATTIC | ATTIC | ATTIC | ... | |
| SYSTEM | SYSTEM A | SYSTEM A | SYSTEM A | ... | SYSTEM A |
| DEVICE | FFF001DD | FFF001DD | FFF002DD | ... | RRR100F |

PROCESS AND OPERATION INFORMATION
(CASE NAME=α, PROPERTY NAME=AAA)

| PROCESS AND OPERATION Gr | Gr1 | Gr2 | Gr3 | ... | GrY |
|---|---|---|---|---|---|
| PROCESS | CONSTRUCTION WORK | TEST | CONSTRUCTION WORK | ... | TEST |
| OPERATION | INSTALL INDOOR UNIT | WATER FLOW TEST | REFRIGERANT PIPE LAYING | ... | AIRTIGHTNESS TEST |

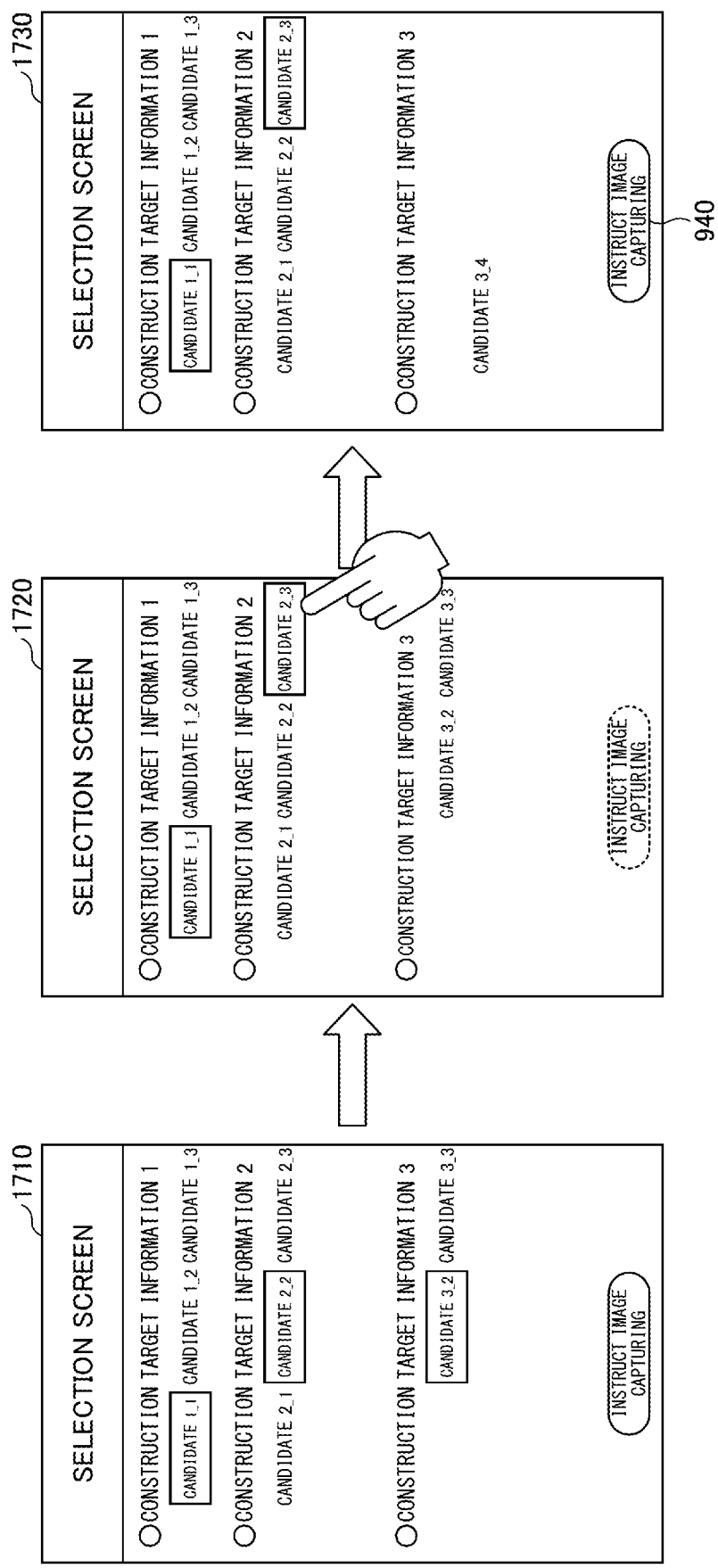

TERMINAL DEVICE AND PROGRAM

TECHNICAL FIELD

The present disclosure relates to a terminal device and a program.

BACKGROUND ART

Generally, at the time of constructing various device systems, a constructor takes a construction photograph at each construction site. At this time, the constructor uses a terminal device to input various kinds of information (constructor name, imaging person name, imaging date and time, case name, property name, information relating to construction site, device name, etc., hereinafter referred to as "construction target information"), and records this information in association with the captured image data.

CITATION LIST

Patent Literature

PTL 1

Japanese Laid-Open Patent Application No. 2014-157596

PTL 2

Japanese Laid-Open Patent Application No. 2003-296346

SUMMARY OF INVENTION

Technical Problem

On the other hand, when taking the construction photograph, there are various kinds of information to be input by the constructor (specifically, the user of the terminal device), and when the scale of the device system is increased, there is a problem in that the operation load on the user increases when inputting information at the construction site.

The present disclosure provides a terminal device and a program for reducing the operation load at a construction site.

Solution to Problem

A first aspect of the present disclosure is a terminal device configured to capture an image of a construction status of a device installed at a plurality of locations, the terminal device including:

an imaging unit configured to capture the image of an imaging target;

an imaging instruction acquiring unit configured to acquire an imaging instruction given by a user to the imaging unit;

a display unit configured to display candidates of each of a plurality of kinds of construction target information to be associated with the image that the user is to capture; and a selecting unit configured to select, according to the user's instruction, a candidate from among the candidates of each of the plurality of kinds of the construction target information displayed on the display unit, wherein when the candidate is selected at the selecting unit, a candidate linked to the selected candidate is displayed on the display unit.

According to the first aspect of the present disclosure, it is possible to provide a terminal device that reduces the operation load at a construction site.

A second aspect of the present disclosure is the terminal device according to the first aspect, wherein the plurality of kinds of the construction target information include at least two kinds of information among information relating to a case, a property, a constructor, an imaging person, a location, a device, operation content, operation progress, evaluation of operation, and imaging date and time.

A third aspect of the present disclosure is the terminal device according to the first aspect, further including:

a registration unit in which linking information is registerable, the linking information relating to linking between the candidates based on the plurality of kinds of the construction target information.

A fourth aspect of the present disclosure is the terminal device according to the first aspect, further including:

a linking information acquiring unit configured to acquire linking information relating to linking between the candidates based on the plurality of kinds of the construction target information, wherein when the selecting unit selects, according to the user's instruction, a candidate of one kind of construction target information among the plurality of kinds of the construction target information displayed on the display unit, the display unit displays a candidate that is linked to the selected candidate and that is of a kind of the construction target information different from the kind of the construction target information to which the selected candidate belongs, based on the linking information acquired by the linking information acquiring unit.

A fifth aspect of the present disclosure is the terminal device according to the first aspect, wherein in an imaging standby state before the imaging instruction acquiring unit acquires the imaging instruction, the candidates of each of the plurality of kinds of the construction target information displayed on the display unit are retained in a selectable manner.

A sixth aspect of the present disclosure is the terminal device according to the first aspect, in a state where one candidate is displayed on the display unit for each of the plurality of kinds of the construction target information, when the imaging instruction acquiring unit acquires the imaging instruction, the imaging instruction is given to the imaging unit, and the selecting unit selects the one candidate displayed on the displayed unit for each of the plurality of kinds of the construction target information.

A seventh aspect of the present disclosure is the terminal device according to the first aspect, further including:

a processing unit configured to associate the image captured by the imaging unit with the candidate of each of the plurality of kinds of the construction target information selected at the selecting unit, wherein when the imaging instruction acquiring unit acquires the imaging instruction after the candidate is selected for each of the plurality of kinds of the construction target information at the selecting unit, the imaging unit captures the image of the imaging target, and the processing unit associates the image captured by the imaging unit with the candidate of each of the plurality of kinds of the construction target information selected at the selecting unit.

Further, an eighth aspect of the present disclosure is a program that causes a computer of a terminal device including an imaging unit configured to capture an image of a construction status of a device installed at a plurality of locations, to execute:

an imaging instruction acquiring step of acquiring an imaging instruction given by a user to the imaging unit;

a displaying step of displaying candidates of each of a plurality of kinds of construction target information to be associated with the image that the user is to capture; and a selecting step of selecting, according to the user's instruction, a candidate of each of the plurality of kinds of the construction target information displayed at the displaying step, wherein when the candidate is selected at the selecting step, the displaying step includes displaying a candidate linked to the selected candidate.

According to the eighth aspect of the present disclosure, it is possible to provide a program that reduces the operation load at a construction site.

BRIEF DESCRIPTION OF DRAWINGS

FIG. 4 is a diagram illustrating an example of a hardware configuration of the server apparatus and the terminal device.

FIG. 12A is a first diagram illustrating construction target information in an application example.

FIG. 12B is a second diagram illustrating construction target information in an application example.

FIG. 17 is a third diagram illustrating a display example of a selection screen.

DESCRIPTION OF EMBODIMENTS

Figure 1:
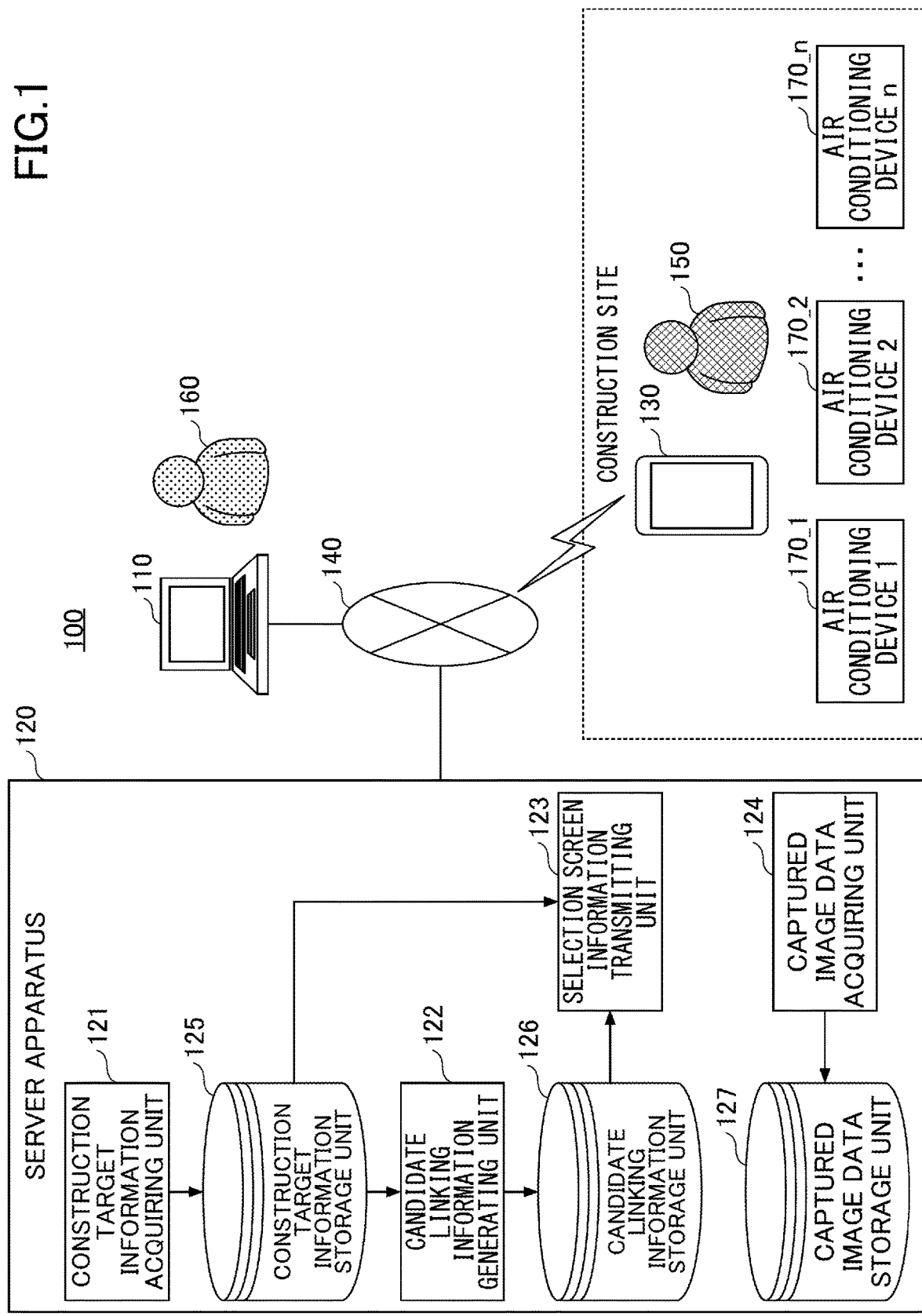
FIG. 1 is a diagram illustrating an example of a system configuration of a construction photograph collection system.

Hereinafter, embodiments will be described with reference to the accompanying drawings. In the specification and the drawings, elements having substantially the same function and configuration are denoted by the same reference numerals, and overlapping description thereof will be omitted.

First Embodiment

System Configuration of Construction Photograph Collection System

First, a system configuration of a construction photograph collection system will be described. FIG. 1 is a diagram illustrating an example of a system configuration of a construction photograph collection system. As illustrated in FIG. 1, a construction photograph collection system 100 includes an information input apparatus 110, a server apparatus 120, and a terminal device 130. In the construction photograph collection system 100, each of the information input apparatus 110 and the terminal device 130 is communicably connected to the server apparatus 120.

The information input apparatus 110 is an apparatus used by a business operator 160. In response to a request from a customer, the business operator 160 designs the facility of the device system. Further, the business operator 160 registers, in the server apparatus 120 via the information input apparatus 110, information necessary for a constructor 150 for performing construction according to the facility design of the device system.

In the present embodiment, the business operator 160 registers, in the server apparatus 120, in particular, construction target information to be input when capturing a construction photograph, among pieces of information necessary for the constructor 150 for performing construction according to the facility design of the device system.

Further, in the present embodiment, it will be described that the business operator 160 performs the facility design of an air conditioning system, but the device system for which the business operator 160 performs facility design is not limited to an air conditioning system, and may be another device system.

The business operator 160 generates a document for reporting a construction status by using captured image data (captured image data obtained by capturing an image of a construction photograph) collected by the server apparatus 120, according to registration of construction target information in the server apparatus 120 by the information input apparatus 110. The document for reporting the construction status is hereinafter referred to as a "completion book". The business operator 160 delivers the generated completion book to the customer.

The server apparatus 120 provides the terminal device 130 with information (selection screen information) used for generating a selection screen used when the constructor 150 inputs construction target information to the terminal device 130 at the construction site. Further, the server apparatus 120 collects captured image data associated with the construction target information. The captured image data is generated by taking a construction photograph by using the terminal device 130 after the constructor 150 inputs the construction target information.

Specifically, a construction photograph collection program is installed in the server apparatus 120, and the server apparatus 120 functions as a construction target information acquiring unit 121 and a candidate linking information generating unit 122 by executing the program. Further, the server apparatus 120 functions as a selection screen information transmitting unit 123 and a captured image data acquiring unit 124, by executing the program.

The construction target information acquiring unit 121 acquires a plurality of kinds of construction target information input by the business operator 160 via the information input apparatus 110, and stores the construction target information in a construction target information storage unit 125.

The candidate linking information generating unit 122 analyzes a plurality of kinds of construction target information stored in the construction target information storage unit 125, identifies a candidate belonging to each piece of construction target information, and generates candidate linking information for identifying the linking between candidates based on construction target information. Further, the candidate linking information generating unit 122 stores the generated candidate linking information in a candidate linking information storage unit 126.

The selection screen information transmitting unit 123 provides, to the terminal device 130, selection screen information necessary for generating a selection screen displayed on the terminal device 130 when the constructor 150 selects one candidate from among candidates belonging to each of a plurality of kinds of construction target information displayed on the terminal device 130. The selection screen information includes a plurality of kinds of construction target information and candidate linking information.

The captured image data acquiring unit 124 acquires, from the terminal device 130, captured image data generated by taking a construction photograph by the constructor 150. Further, the captured image data acquiring unit 124 stores the acquired captured image data in a captured image data storage unit 127.

The terminal device 130 is a device carried by the constructor 150 at the construction site (that is, the constructor 150 is a user of the terminal device 130). The constructor 150 carries the terminal device 130 when constructing the air conditioning system including an air conditioning device 1 (reference numeral 170_1) to an air conditioning device n (reference numeral 170_n).

The terminal device 130 requests the server apparatus 120 for selection screen information, and acquires the selection screen information from the server apparatus 120. Further, the terminal device 130 generates a selection screen based on the acquired selection screen information and displays the selection screen for the constructor 150.

Further, the constructor 150 selects one candidate from among candidates belonging to each of the plurality of kinds of construction target information on the selection screen displayed on the terminal device 130. Every time one candidate is selected for each piece of construction target information, the terminal device 130 refers to the candidate linking information, narrows down candidates belonging to pieces of construction target information other than the construction target information to which the selected candidate belongs, and displays a selection screen after the narrowing down.

In this manner, every time a candidate is selected, the terminal device 130 narrows down candidates belonging to other construction target information and displays a selection screen after the narrowing down. Therefore, according to the terminal device 130, it is possible to reduce the operation load of the constructor 150 at the construction site.

Configuration Example of Completion Book

Figure 2:
FIG. 2 is a diagram illustrating an example of the configuration of a completion book.

Next, an example of the configuration of a completion book to be delivered to a customer will be described. FIG. 2 is a diagram illustrating an example of the configuration of a completion book. As illustrated in FIG. 2, a completion book 200 includes a cover, a device delivery document, an instruction manual, a completion drawing, an air conditioner test operation table, an airtightness test result table, a water flow test result table, an airflow volume measurement test comparison table, a construction photograph ledger, a facility management ledger, a guarantee form, a maintenance contact list, and the like.

In the server apparatus 120 according to the present embodiment, the captured image data to be inserted into the construction photograph ledger data is collected from the documents constituting the completion book 200. Therefore, in the present embodiment, the construction target information registered by the business operator 160 is mainly information used for generating the construction photograph ledger.

Process Flow of Construction Photograph Collection System

Figure 3:
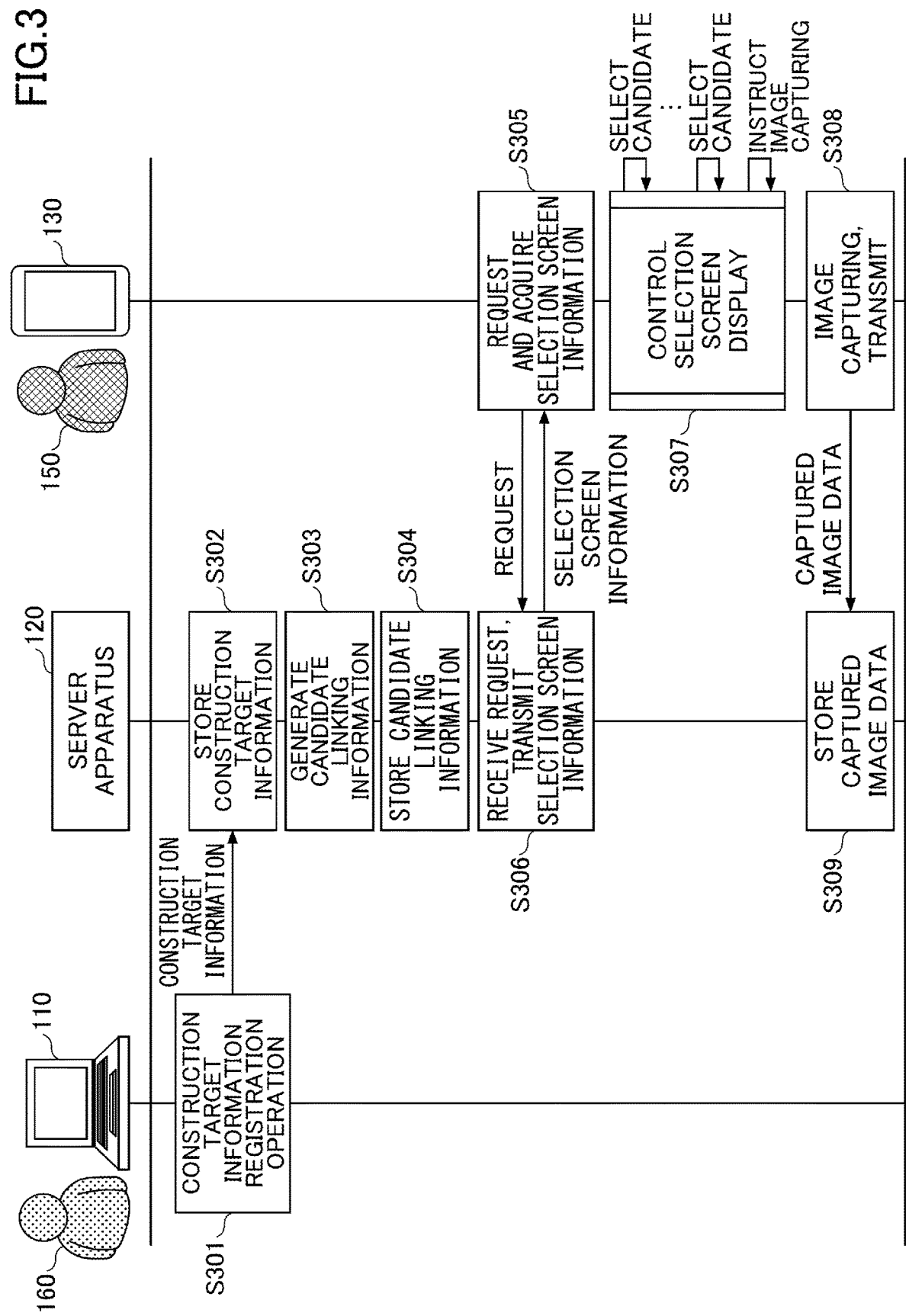
FIG. 3 is a sequence diagram illustrating a flow of a construction photograph collection process by the construction photograph collection system.

Next, a flow of a construction photograph collection process by the construction photograph collection system 100 will be described. FIG. 3 is a sequence diagram illustrating a flow of a construction photograph collecting process by the construction photograph collecting system.

As illustrated in FIG. 3, in step S301, the business operator 160 inputs a plurality of kinds of construction target information via the information input apparatus 110 and registers the information in the server apparatus 120.

In step S302, the construction target information acquiring unit 121 of the server apparatus 120 acquires the construction target information transmitted from the information input apparatus 110 and stores the construction target information in the construction target information storage unit 125.

In step S303, the candidate linking information generating unit 122 of the server apparatus 120 identifies the linking between candidates based on a plurality of kinds of construction target information stored in the construction target information storage unit 125, and generates candidate linking information.

In step S304, the candidate linking information generating unit 122 of the server apparatus 120 stores the generated candidate linking information in the candidate linking information storage unit 126.

In step S305, the terminal device 130 requests the server apparatus 120 for selection screen information, and acquires the selection screen information from the server apparatus 120.

In step S306, upon receiving the request from the terminal device 130, the selection screen information transmitting unit 123 of the server apparatus 120 the transmits selection screen information including a plurality of kinds of construction target information and candidate linking information to the terminal device 130.

In step S307, the terminal device 130 generates a selection screen based on the selection screen information acquired from the server apparatus 120, and displays the selection screen for the constructor 150. Further, the terminal device 130 receives an instruction of candidate selection from the constructor 150, for candidates belonging to each of the plurality of kinds of construction target information included in the selection screen. Further, the terminal device 130 transitions from an imaging standby state to an imaging ready state, upon acquiring an imaging instruction from the constructor 150. Details of the selection screen display control process will be described later.

In step S308, the constructor 150 takes a construction photograph. Further, the terminal device 130 transmits, to the server apparatus 120, captured image data generated as a result of the constructor 150 taking a construction photograph.

In step S309, the captured image data acquiring unit 124 of the server apparatus 120 acquires the captured image data transmitted from the terminal device 130, and stores the captured image data in the captured image data storage unit 127. Accordingly, the business operator 160 can generate the construction photo ledger by using the captured image data stored in the captured image data storage unit 127.

Hardware Configuration of Server Apparatus and Terminal Device

Next, a hardware configuration of the server apparatus 120 and the terminal device 130 will be described. FIG. 4 is a diagram illustrating an example of a hardware configuration of the server apparatus and the terminal device.

(1) Hardware Configuration of Server Apparatus

As illustrated in the 4a of FIG. 4, the server apparatus 120 includes a central processing unit (CPU) 401, a read only memory (ROM) 402, and a random access memory (RAM) 403. The CPU 401, the ROM 402 and the RAM 403 form what is referred to as a computer.

The server apparatus 120 further includes an auxiliary storage device 404, a display device 405, an operation device 406, a communication device 407, and a drive device 408. The hardware elements of the server apparatus 120 are connected to each other via a bus 409.

The CPU 401 is a calculation device that executes various programs (for example, a construction photograph collection program and the like) installed in the auxiliary storage device 404.

The ROM 402 is a non-volatile memory. The ROM 402 functions as a main storage device that stores various programs, data, and the like necessary for the CPU 401 to execute various programs installed in the auxiliary storage device 404. To be more specific, the ROM 402 functions as a main storage device that stores a boot program or the like such as a basic input/output system (BIOS), an extensible firmware interface (EFI), or the like.

The RAM 403 is a volatile memory such as DRAM (Dynamic Random Access Memory), SRAM (Static Random Access Memory), and the like. The RAM 403 functions as a main storage device that provides a work area in which various programs installed in the auxiliary storage device 404 are expanded when the programs are executed by the CPU 401.

The auxiliary storage device 404 is an auxiliary storage device that stores various programs and information used when the various programs are executed. The construction target information storage unit 125, the candidate linking information storage unit 126, and the captured image data storage unit 127 are implemented in the auxiliary storage device 404.

The display device 405 is a display device that displays an internal state of the server apparatus 120. The operation device 406 is an input device used when an administrator (not illustrated) of the server apparatus 120 inputs various instructions to the server apparatus 120.

The communication device 407 is a communication device that is connected to a network 140 and communicates with the information input apparatus 110, the terminal device 130, and the like.

The drive device 408 is a device for setting a recording medium 410. The recording medium 410 includes a medium for optically, electrically, or magnetically recording information, such as a CD-ROM, a flexible disk, a magneto-optical disk, and the like. Further, the recording medium 410 may include a semiconductor memory or the like that electrically records information such as a ROM, a flash memory, or the like.

The various programs to be installed in the auxiliary storage device 404 are installed by, for example, setting the distributed recording medium 410 in the drive device 408 and reading the various programs recorded in the recording medium 410 by the drive device 408. Alternatively, the various programs to be installed in the auxiliary storage device 404 may be installed by being downloaded from the network 140 via the communication device 407.

(2) Hardware Configuration of Terminal Device

As illustrated in the 4b of FIG. 4, the terminal device 130 has the same hardware configuration (a CPU 421, a ROM 422, a RAM 423, an auxiliary storage device 424, a display device 425, an operation device 426, and a communication device 427) as that of the server apparatus 120. Therefore, the difference from the server apparatus 120 will be described here.

The difference from the server apparatus 120 is that the terminal device 130 includes an imaging device 428 that functions as an imaging unit. The imaging device 428 is activated based on an imaging instruction by the constructor 150 and captures an image of an imaging target.

In the terminal device 130, the display device 425 functions as a display unit that displays candidates belonging to each of the plurality of kinds of construction target information. In the terminal device 130, the operation device 426 functions as a selecting unit used when inputting an instruction of candidate selection from among candidates belonging to each of a plurality of kinds of construction target information.

Details of Construction Target Information and Candidate Linking Information

Next, details of the construction target information that is acquired by the construction target information acquiring unit 121 of the server apparatus 120 and stored in the construction target information storage unit 125, and the candidate linking information that is generated by the candidate linking information generating unit 122 and stored in in the candidate linking information storage unit 126, will be described.

(1) Details of Construction Target Information

Figure 5:
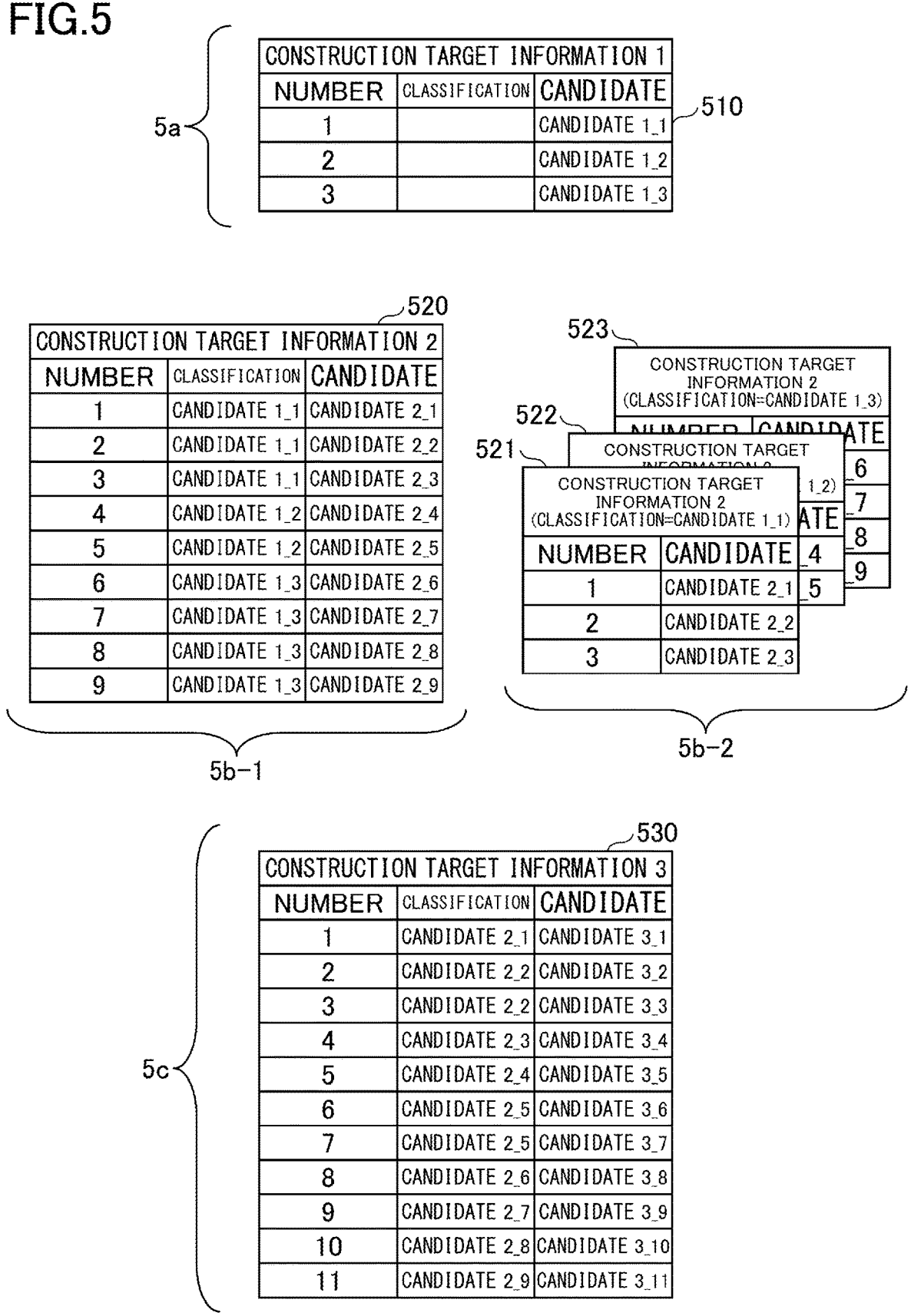
FIG. 5 is a diagram illustrating an example of construction target information.

FIG. 5 is a diagram illustrating an example of construction target information. The example of FIG. 5 indicates that three kinds of construction target information (construction target information (1) to construction target information (3)) are stored in the construction target information storage unit 125. Here, for simplification of description, it is assumed that each of the three kinds of construction target information include the same information items.

Specifically, each of the three kinds of construction target information include "number", "classification", and "candidate" as information items.

In "number", a number assigned to a candidate belonging to each piece of construction target information is stored.

Further, in "classification", information indicating each classification is stored, in a case where a plurality of candidates belonging to each piece of construction target information are classified into a plurality of classifications. In the example of FIG. 5, the candidates belonging to each piece of construction target information are classified according to the candidates belonging to the construction target information of the upper hierarchy, and, therefore, one of the candidates belonging to the construction target information of the upper hierarchy is stored in the "classification".

In "candidate", a candidate belonging to each piece of construction target information is stored.

The example of the 5a in FIG. 5 indicates that there are three candidates ("candidate 1_1" to "candidate 1_3") belonging to the construction target information (1) (reference numeral 510), and numbers="1" to "3" are assigned to the candidates, respectively. The construction target information (1) (reference numeral 510) is the construction target information of the uppermost hierarchy, and, therefore, "classification" is blank.

Similarly, the example of 5b-1 in FIG. 5 indicates that there are nine candidates ("candidate 2_1" to "candidate 2_9") belonging to the construction target information (2) (reference numeral 520), and numbers="1" to "9" are assigned to the candidates, respectively. Further, the example of 5b-1 in FIG. 5 indicates that nine candidates ("candidate 2_1" to "candidate 2_9") belonging to the construction target information (2) (reference numeral 520) are respectively classified into one of classifications="candidate 1_1" to "candidate 1_3".

As illustrated in 5b-2 in FIG. 5, the candidates belonging to the construction target information (2) may be stored separately by each classification. The example of 5b-2 in FIG. 5 indicates that there are three candidates ("candidate 2_1" to "candidate 2_3") belonging to the construction target information (2) of (classification=candidate 1_1), (reference numeral 521). Further, it is indicated that there are two candidates ("candidate 2_4" and "candidate 2_5") belonging to the construction target information (2) of (classification=candidate 1_2), (reference numeral 522). Further, it is indicated that there are four candidates ("candidate 2_6" to "candidate 2_9") belonging to the construction target information (2) of (classification=candidate 1_3), (reference numeral 523).

Similarly, the example of FIG. 5 indicates that there are eleven candidates ("candidate 3_1" to "candidate 3_11") belonging to the construction target information (3) (reference numeral 530), and numbers="1" to "11" are assigned to the candidates, respectively. Further, the example of FIG. 5 indicates that 11 candidates ("candidate 3_1" to "candidate 3_11") belonging to the construction target information (3) (reference numeral 530) are respectively classified into one of classifications="candidate 2_1" to "candidate 2_9".

(2) Details of Candidate Linking Information

Figure 6:
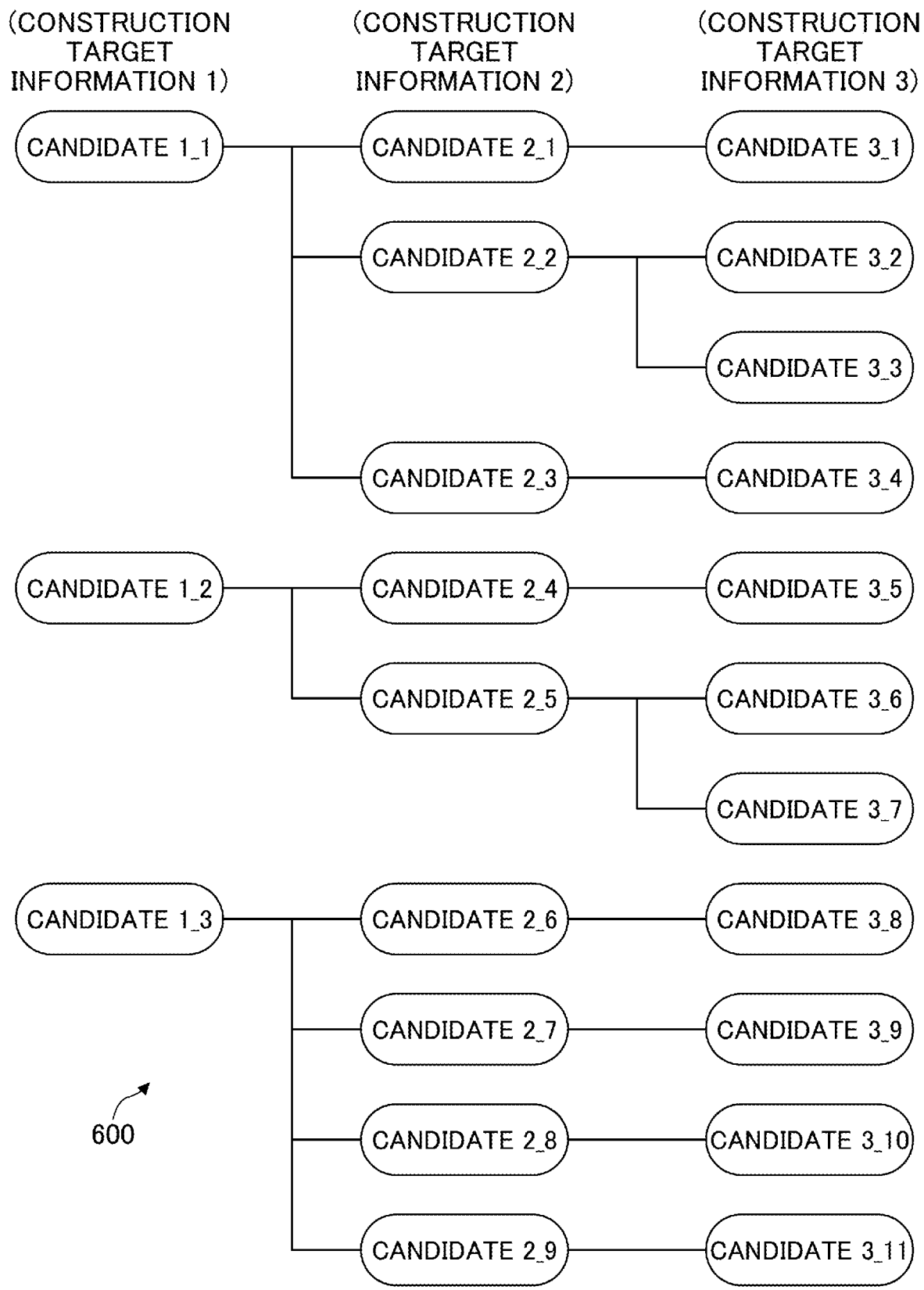
FIG. 6 is a diagram illustrating an example of candidate linking information.

FIG. 6 is a diagram illustrating an example of candidate linking information. The example of FIG. 6 illustrates candidate linking information 600 generated based on candidates belonging to the construction target information (1) (reference numeral 510) to the construction target information (3) (reference numeral 530) of FIG. 5.

As illustrated in FIG. 6, candidates belonging to the construction target information (1) (reference numeral 510) and candidates belonging to the construction target information (2) (reference numeral 520) are linked to each other on the basis of "classification".

For example, among the nine candidates belonging to the construction target information (2) (reference numeral 520), the candidates classified into the classification="candidate 1_1" are linked to "candidate 1_1" belonging to the construction target information (1) (reference numeral 510). Specifically, "candidate 2_1", "candidate 2_2", and "candidate 2_3" are linked to the candidate 1_1.

Similarly, as illustrated in FIG. 6, candidates belonging to the construction target information (2) (reference numeral 520) and candidates belonging to the construction target information (3) (reference numeral 530) are linked to each other on the basis of "classification".

For example, among the 11 candidates belonging to the construction target information (3) (reference numeral 530), the candidate classified into the classification="candidate 2_1" is linked to "candidate 2_1" belonging to the construction target information (2) (reference numeral 520). Specifically, "candidate 3_1" is linked to candidate 2_1.

In this manner, the candidate linking information 600 illustrated in FIG. 6 can be generated by the candidate linking information generating unit 122 by linking to each other the candidates belonging to a plurality of kinds of construction target information, based on the "classification".

In the example illustrated in FIG. 6, the candidates are linked to each other based on "classification", among the information items included in the construction target information. However, the information item used for linking the candidates belonging to different pieces of construction target information to each other, is not limited thereto, and the candidates may be linked by using an information item other than "classification".

Further, in the example of FIG. 6, a case in which candidates belonging to three kinds of construction target information are linked to each other upon being divided into three hierarchies has been described. However, the candidate linking method is not limited to thereto. For example, the candidates belonging to each of the three kinds of construction target information may be linked to each other upon being divided into four or more hierarchies. For example, for one piece of construction target information, a plurality of "candidate" items may be provided, and the linking between the respective "candidates" may be identified (see case and property information 1220 in FIG. 12A to be described later).

Alternatively, for each of the "candidates", a plurality of kinds of "attributes" may be further defined, and the linking between candidates corresponding to the respective "attributes" may be identified (see location and device information 1230_1, process and operation information 1240_1, and the like in FIG. 12B to be described later).

In the example of FIG. 6, the construction target information has been described as including "classification" as an item of information, but the construction target information need not necessarily include "classification". In this case, a candidate belonging to such construction target information means that this candidate is not linked to a candidate belonging to construction target information in a hierarchy higher than that of the corresponding construction target information (see imaging timing information 1250, evaluation information 1270, and imaging date and time information 1280 in FIG. 12C to be described later).

Functional Configuration of Terminal Device

Figure 7:
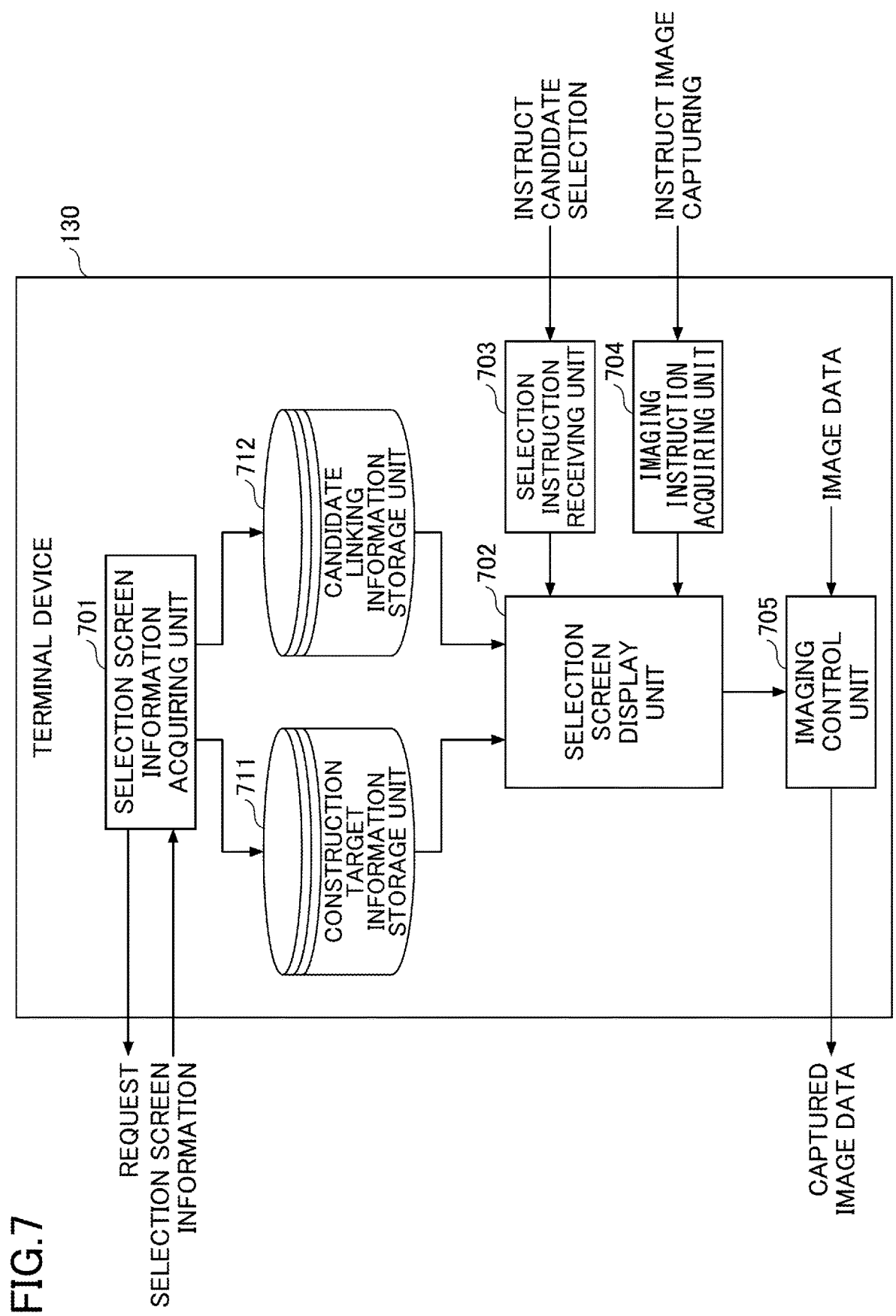
FIG. 7 is a diagram illustrating an example of a functional configuration of the terminal device.

Next, a functional configuration of the terminal device 130 will be described. FIG. 7 is a diagram illustrating is a diagram illustrating an example of a functional configuration of the terminal device. A selection screen generation program is installed in the terminal device 130, and the terminal device 130 functions as a selection screen information acquiring unit 701 by executing the program. Further, the terminal device 130 functions as a selection screen display unit 702, a selection instruction receiving unit 703, an imaging instruction acquiring unit 704, and an imaging control unit 705 by executing the program.

The selection screen information acquiring unit 701 is an example of a construction target information acquiring unit and a candidate linking information acquiring unit. The selection screen information acquiring unit 701 requests the server apparatus 120 for selection screen information and acquires the selection screen information from the server apparatus 120. Further, the selection screen information acquiring unit 701 stores, in a construction target information storage unit 711, the construction target information included in the acquired selection screen information, and stores, in a candidate linking information storage unit 712 (an example of a registration unit), the candidate linking information included in the acquired selection screen information.

The selection screen display unit 702 generates a selection screen based on the construction target information stored in the construction target information storage unit 711 and the candidate linking information stored in the candidate linking information storage unit 712, and displays the selection screen on the display device 425.

Further, the selection screen display unit 702 refers to the candidate linking information and narrows down candidates to be displayed on the selection screen from among candidates belonging to each piece of construction target information, every time an instruction of candidate selection by the constructor 150 is reported from the selection instruction receiving unit 703. Further, the selection screen display unit 702 generates and displays a selection screen after the candidates are narrowed down.

Further, the selection screen display unit 702 transitions to a state in which the imaging device 428 can be activated when the instruction of candidate selection by the constructor 150 is completed for each of the plurality of kinds of construction target information. When the imaging instruction is reported from the imaging instruction acquiring unit 704, the selection screen display unit 702 reports, to the imaging control unit 705, the candidate selected in each of the plurality of kinds of construction target information, and instructs the imaging control unit 705 to activate the imaging device 428.

The selection instruction receiving unit 703 receives an instruction of candidate selection that is input by the constructor 150 via the operation device 426 for each of the plurality of kinds of construction target information. Further, the selection instruction receiving unit 703 reports, to the selection screen display unit 702, the received instruction of candidate selection.

The imaging instruction acquiring unit 704 receives an imaging instruction that is input by the constructor 150 via the operation device 426, and reports the imaging instruction to the selection screen display unit 702.

The imaging control unit 705 is an example of a processing unit, and the imaging control unit 705 activates the imaging device 428 based on an activation instruction reported from the selection screen display unit 702. Further, the imaging control unit 705 generates captured image data by associating image data obtained by the imaging device 428 by capturing the imaging target, with the candidate selected in each of the plurality of kinds of construction target information, and transmits the generated captured image data to the server apparatus 120.

Display Example of Selection Screen

Next, a selection screen that is generated by the selection screen display unit 702 based on the construction target information (reference numerals 510 to 530) and the candidate linking information 600, and that is displayed on the display device 425 of the terminal device 130, will be described.

Figure 8:
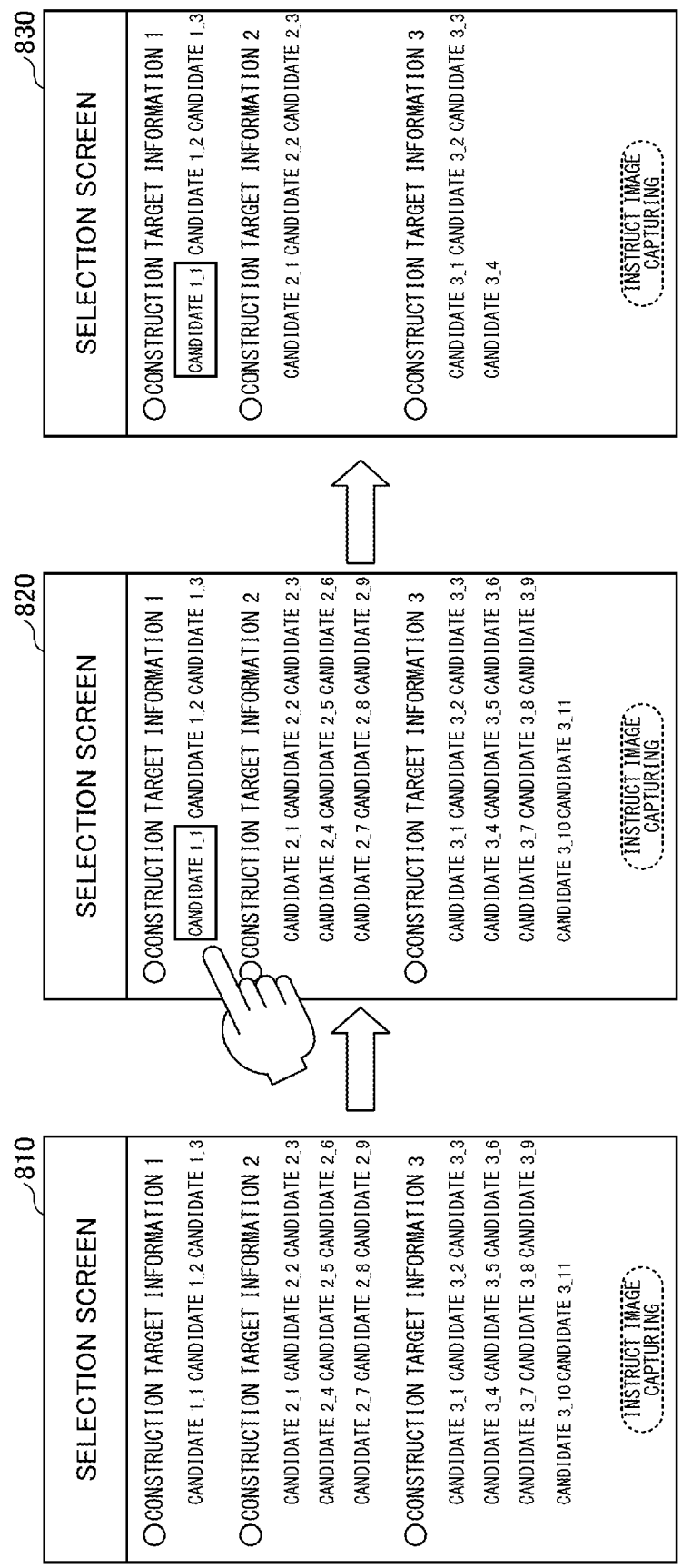
FIG. 8 is a first diagram illustrating a display example of a selection screen.

FIG. 8 is a first diagram illustrating a display example of the selection screen. In FIG. 8, a selection screen 810 indicates an example of an initial selection screen generated by the selection screen display unit 702.

As illustrated in the selection screen 810, the kind names (construction target information (1), construction target information (2), and construction target information (3)) of the three kinds of construction target information illustrated in FIG. 5 are displayed on the initial selection screen.

Further, as illustrated in the selection screen 810, in the initial selection screen, all of the candidates belonging to each of the three kinds of construction target information are displayed (the three candidates for the construction target information (1), the nine candidates for the construction target information (2), and the eleven candidates for the construction target information (3) are all displayed).

It is assumed that the constructor 150 selects "candidate 1_1" from the three candidates belonging to the construction target information (1) in a state in which the selection screen 810 is displayed. A selection screen 820 illustrates a state in which the constructor 150 selects "candidate 1_1" from among the three candidates belonging to the construction target information (1).

When "candidate 1_1" is selected by the constructor 150, the selection screen display unit 702 refers to the candidate linking information 600, and extracts the candidates linked to "candidate 1_1" from among nine candidates belonging to the construction target information (2).

According to the candidate linking information 600, among the nine candidates belonging to the construction target information (2), candidates linked to "candidate 1_1" are "candidate 2_1", "candidate 2_2", and "candidate 2_3". Therefore, as illustrated in a selection screen 830, the selection screen display unit 702 displays only "candidate 2_1", "candidate 2_2", and "candidate 2_3" as candidates belonging to the construction target information (2).

Further, the selection screen display unit 702 refers to the candidate linking information 600 and extracts the candidates linked to "candidate 2_1", "candidate 2_2", and "candidate 2_3" from among the 11 candidates belonging to the construction target information (3).

According to the candidate linking information 600, among the 11 candidates belonging to the construction target information (3), the candidates linked to "candidate 2_1", "candidate 2_2", and "candidate 2_3" are "candidate 3_1", "candidate 3_2", "candidate 3_3", and "candidate 3_4". Therefore, as illustrated in the selection screen 830, the selection screen display unit 702 displays only "candidate 3_1", "candidate 3_2", "candidate 3_3", and "candidate 3_4" as candidates belonging to the construction target information (3).

Figure 9:
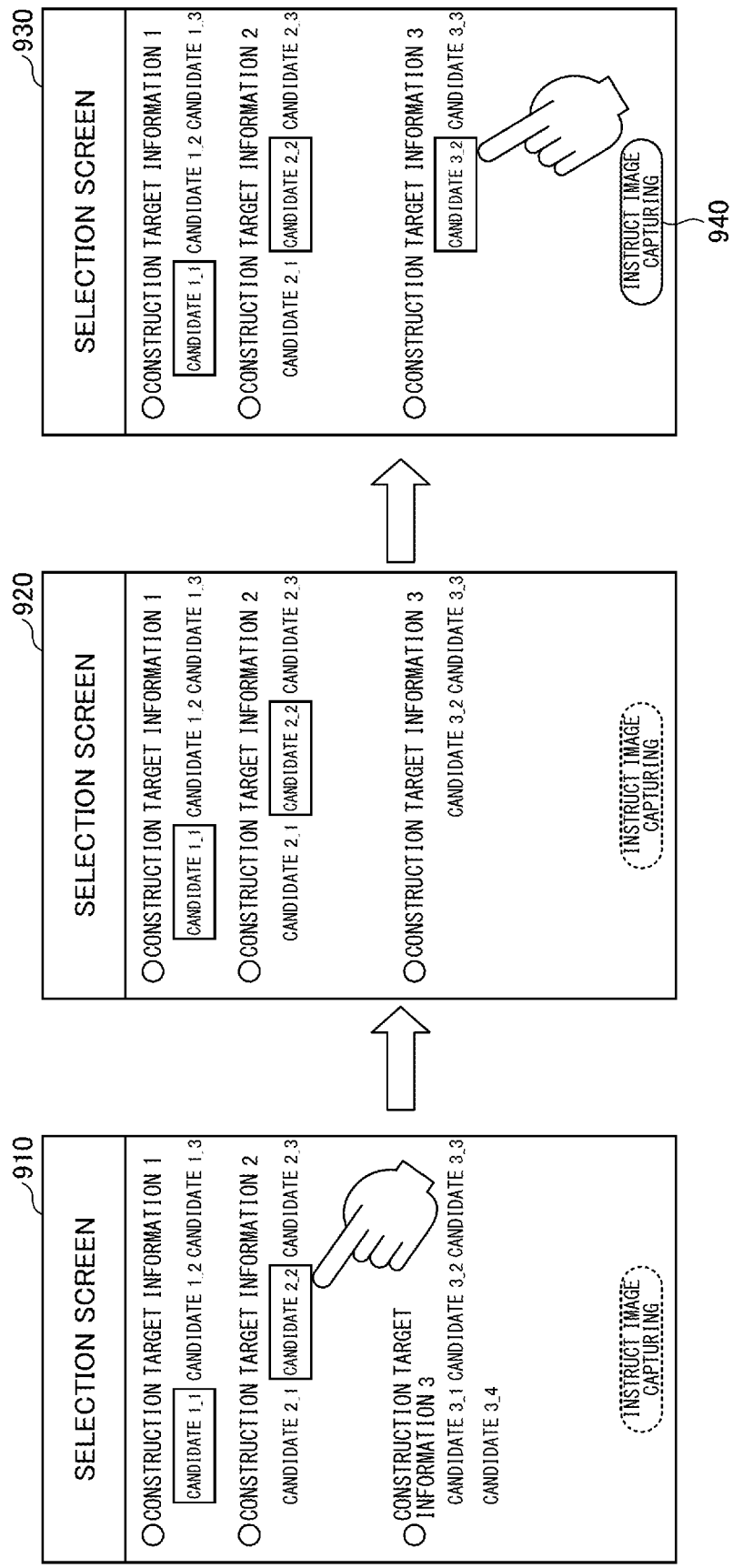
FIG. 9 is a second diagram illustrating a display example of a selection screen.

Subsequently, the process proceeds to FIG. 9. FIG. 9 is a second diagram illustrating a display example of the selection screen. A selection screen 910 indicates a state in which the constructor 150 selects "candidate 2_2" from among the three candidates belonging to the construction target information (2) in a state in which the selection screen 830 of FIG. 8 is displayed.

When "candidate 2_2" is selected by the constructor 150, the selection screen display unit 702 refers to the candidate linking information 600, and extracts candidates linked to "candidate 2_2" from among the 11 candidates belonging to the construction target information (3).

According to the candidate linking information 600, among the 11 candidates belonging to the construction target information (3), the candidates linked to "candidate 2_2" are "candidate 3_2" and "candidate 3_3". Therefore, as indicated in the selection screen 920, the selection screen display unit 702 displays only "candidate 3_2" and "candidate 3_3" as candidates belonging to the construction target information (3).

It is assumed that the constructor 150 selects "candidate 3_2" from among the two candidates belonging to the construction target information (3) in a state in which the selection screen 920 is displayed. A selection screen 930 indicates a state in which the constructor 150 selects "candidate 3_2" from among the two candidates belonging to the construction target information (3).

When "candidate 3_2" is selected by the constructor 150, an imaging instruction button 940 can be pressed in the selection screen display unit 702. Accordingly, the selection screen 930 transitions to a state in which the imaging device 428 can be activated.

When the imaging instruction button 940 is pressed by the constructor 150, the imaging device 428 is activated, and the constructor 150 can capture a construction photograph.

Selection Screen Display Control Process

Figure 10:
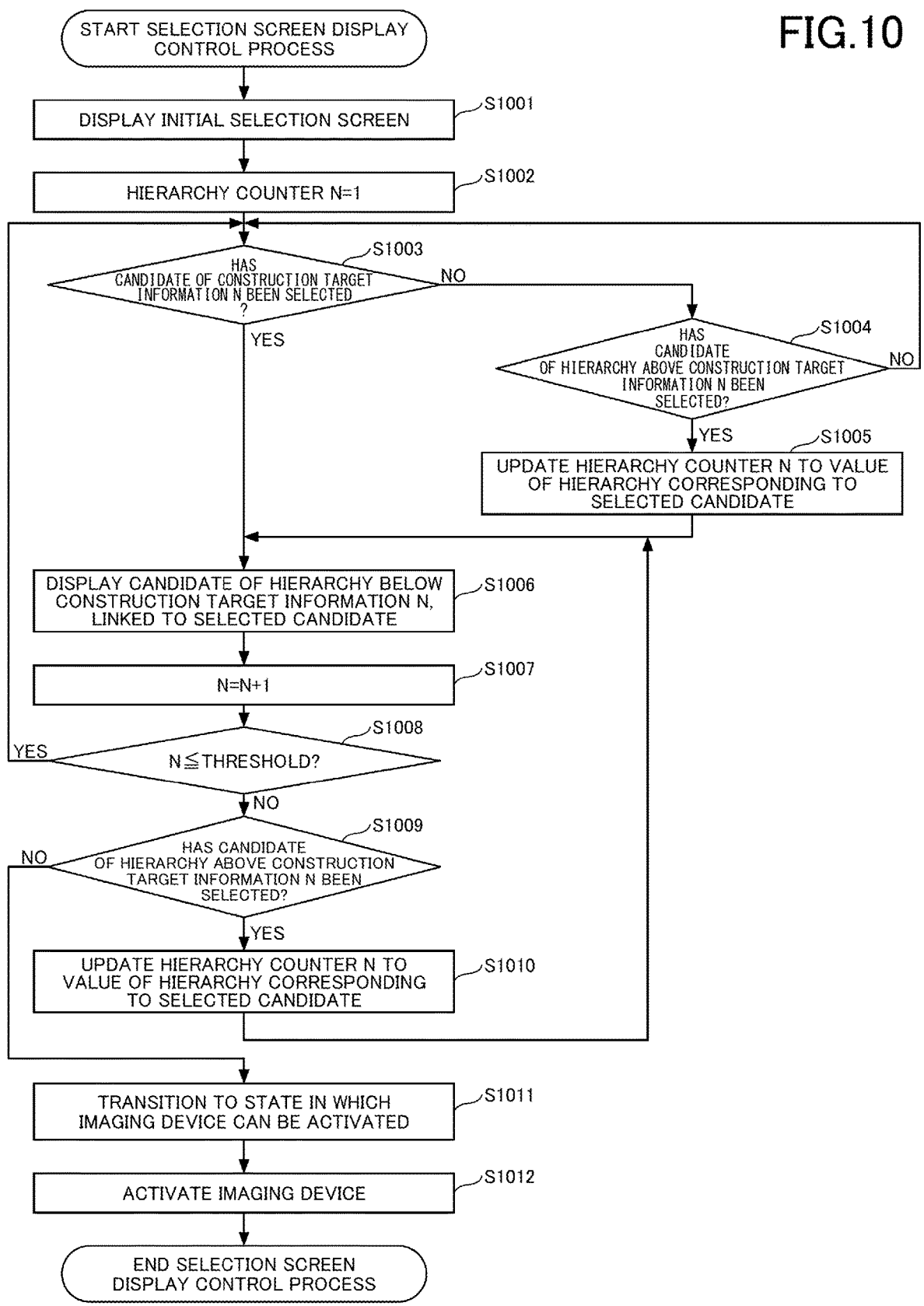
FIG. 10 is a first flowchart illustrating the flow of the selection screen display control process.

Next, the selection screen display control process (step S307) performed by the selection screen display unit 702 of the server apparatus 120 will be described in detail. FIG. 10 is a first flowchart illustrating the flow of the selection screen display control process.

In step S1001, the selection screen display unit 702 generates an initial selection screen (a selection screen in which all candidates belonging to each of a plurality of kinds of construction target information are held in a selectable manner) based on the construction target information, and displays the initial selection screen on the display device 425.

In step S1002, the selection screen display unit 702 inputs "1" to N which is a hierarchy counter.

In step S1003, the selection screen display unit 702 determines whether an instruction of candidate selection for the construction target information N has been reported. When it is determined in step S1003 that an instruction of candidate selection for the construction target information N has been reported (YES in step S1003), the process proceeds to step S1006.

On the other hand, when it is determined in step S1003 that an instruction of candidate selection for the construction target information N has not been reported (NO in step S1003), the process proceeds to step S1004.

In step S1004, the selection screen display unit 702 determines whether an instruction of candidate selection for construction target information in a hierarchy higher than the construction target information N has been reported. In step S1004, in a case where it is determined that the instruction of candidate selection is reported with respect to the construction target information of a hierarchy higher than the construction target information N (in a case of YES in step S1004), the process proceeds to step S1005.

In step S1005, the selection screen display unit 702 updates N, which is the hierarchy counter, to the value of the hierarchy corresponding to the reported instruction of candidate selection, and proceeds to step S1006.

On the other hand, in step S1004, in a case where it is determined that the instruction of candidate selection is not reported with respect to the construction target information of the hierarchy higher than the construction target information N (in a case of NO in step S1004), the process returns to step S1003.

In step S1006, the selection screen display unit 702 refers to the candidate linking information, and displays the candidates which are linked to the candidate for which the instruction of the candidate selection is given, and which belong to the construction target information in the hierarchy lower than the construction target information N.

In step S1007, the selection screen display unit 702 increments N, which is the hierarchy counter, and proceeds to step S1008.

In step S1008, the selection screen display unit 702 determines whether N, which is the hierarchy counter, is less than or equal to a predetermined threshold (for example, in the case of the construction target information illustrated in FIG. 5, the threshold=3). When it is determined in step S1008 that the hierarchy counter N is less than or equal to the predetermined threshold (in the case of YES in step S1008), the process returns to step S1003.

On the other hand, when it is determined in step S1008 that N, which is the hierarchy counter, exceeds the predetermined threshold (in the case of NO in step S1008), the process proceeds to step S1009.

In step S1009, the selection screen display unit 702 determines whether an instruction of candidate selection for construction target information in a hierarchy higher than the construction target information N has been reported (determines whether there has been an instruction to redo the candidate selection). In step S1009, in a case where it is determined that the instruction of candidate selection is reported with respect to the construction target information of the hierarchy higher than the construction target information N (in a case of YES in step S1009), the process proceeds to step S1010.

In step S1010, the selection screen display unit 702 updates N, which is the hierarchy counter, to the value of the hierarchy corresponding to the reported instruction of candidate selection, and returns to step S1006.

On the other hand, in step S1009, in a case where it is determined that the instruction of candidate selection is not reported with respect to the construction target information of the hierarchy higher than the construction target information N (in a case of NO in step S1009), the process proceeds to step S1011.

In step S1011, the selection screen display unit 702 enables the imaging instruction button 940 to be pressed. Accordingly, the selection screen transitions to a state in which the imaging device 428 can be activated.

In step S1012, when the imaging instruction button 940 is pressed by the constructor 150, the selection screen display unit 702 instructs the imaging control unit 705 to activate the imaging device 428. Accordingly, the imaging device 428 is activated, and the terminal device 130 transitions from the imaging standby state to the imaging ready state, thereby ending the selection screen display control process.

Specific Example of Imaging and Transmission Process

Figure 11:
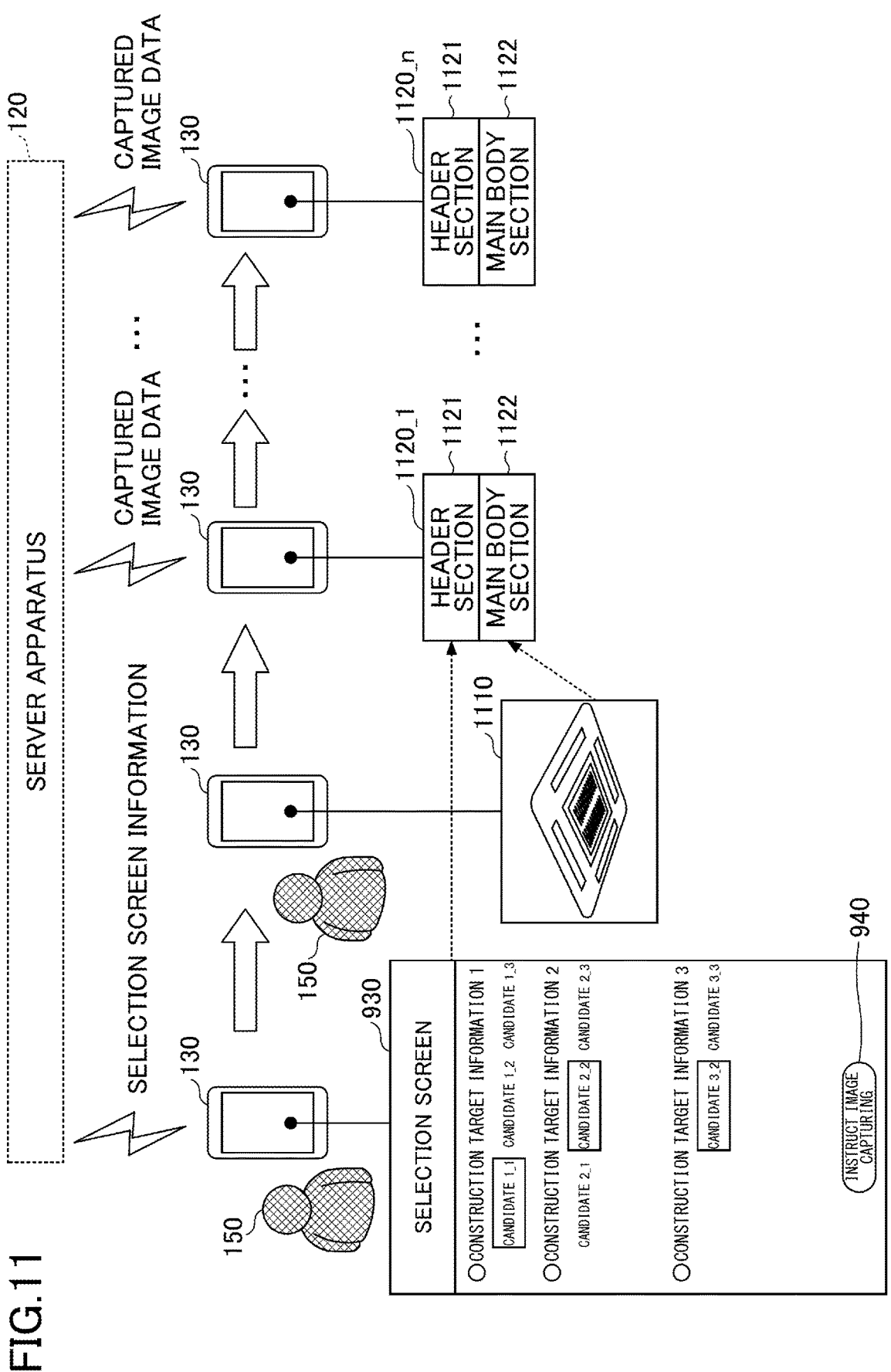
FIG. 11 is a diagram illustrating a specific example of an imaging and transmission process.

Next, a specific example of the imaging and transmission process (step S308) by the terminal device 130 will be described. FIG. 11 is a diagram illustrating a specific example of the imaging and transmission process.

As illustrated in FIG. 11, when the terminal device 130 acquires the selection screen information and the constructor 150 inputs an instruction of candidate selection so that the selection screen 930 is displayed, the constructor 150 presses the imaging instruction button 940. Accordingly, in the terminal device 130, the imaging device 428 is activated, and a monitor image 1110 is displayed on the display device 425.

When the constructor 150 takes a photograph in a state in which the monitor image 1110 is displayed on the display device 425 of the terminal device 130, the imaging control unit 705:

- records image data of the monitor image 1110 in a main body section 1122; and
- records the candidate selected in each of the plurality of kinds of construction target information, in a header section 1121.

Accordingly, captured image data 1120_1 is generated and is transmitted to the server apparatus 120.

As illustrated in FIG. 11, the terminal device 130 repeats the same process every time the constructor 150 takes a construction photograph at each construction site. Accordingly, at the time when the capturing of all of the construction photographs is completed, a plurality of pieces of captured image data 1120_1 to 1120_n are stored in the captured image data storage unit 127 of the server apparatus 120.

EXAMPLES

Next, an application example in a case where the selection screen display control process is executed in an air conditioning system as an application target, including the air conditioning device 1 (reference numeral 170_1) to the air conditioning device n (reference numeral 170_n), will be described with reference to FIGS. 12A to 15.

Figure 12C:
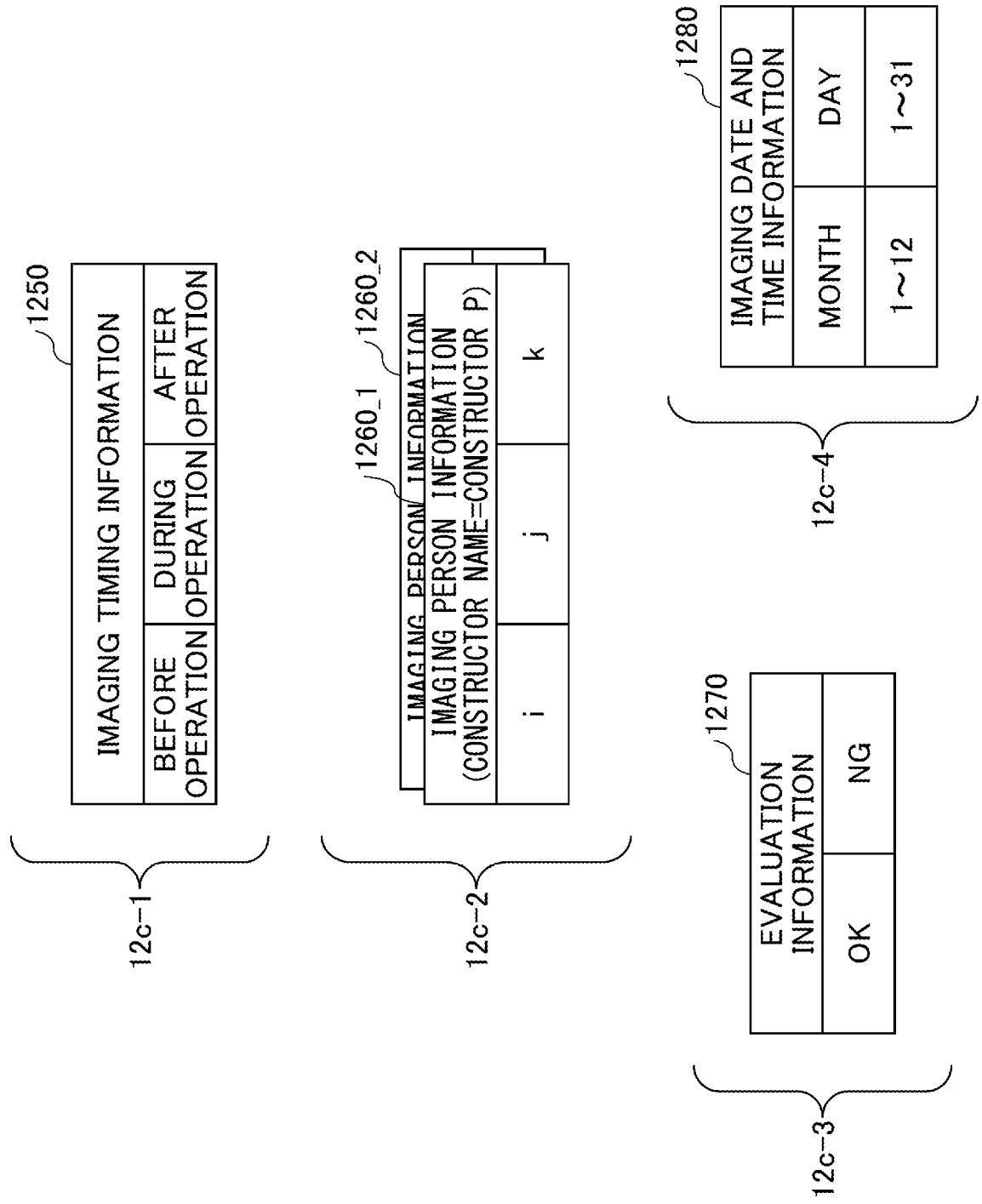
FIG. 12C is a third diagram illustrating construction target information in an application example.

FIGS. 12A to 12C are diagrams illustrating construction target information in an application example. As illustrated in FIGS. 12A to 12C, in a case where the selection screen display control process is executed in the air conditioning system as the application target including the air conditioning device 1 (reference numeral 170_1) to the air conditioning device n (reference numeral 170_n), for example, as the construction target information, the following eight pieces of construction target information are registered in the construction target information storage unit 711:

- constructor information 1210,
- case and property information 1220,
- location and device information 1230_1, 1230_2,
- process and operation information 1240_1 and 1240_2 (an example of information relating to operation content),
- imaging timing information 1250 (an example of information relating to operation progress),
- imaging person information 1260_1 and 1260_2,
- evaluation information 1270, and
- imaging date and time information 1280.

In the example of 12a-1 in FIG. 12A, one of the pieces of construction target information is constructor information 1210, and at least two candidates of constructor names="constructor P" and "constructor Q" are included as candidates belonging to the constructor information 1210.

Further, the example of 12a-2 in FIG. 12A illustrates an example in which one of the pieces of construction target information is case and property information 1220 and at least one candidate of the case name="α" is included as a candidate belonging to the case name. Further, an example in which at least two candidates of property names="AAA" and "BBB" are included as candidates belonging to the property name is illustrated. Further, the example of 12a-2 in FIG. 12A indicates that, with respect to both of the property names="AAA" and "BBB" linked to the case name="α", the constructor name="constructor P" is the contract constructor, and both of the properties are linked to the constructor name="constructor P".

Further, in the example in 12b-1 of FIG. 12B, one of the pieces of construction target information is the location and device information, and indicates the following examples:

- an example of location and device information 1230_1 linked to the case name="α" and the property name="AAA"; and
- an example of the location and device information 1230_2 linked to the case name="α" and the property name="BBB".

Further, the example of 12b-1 in FIG. 12B illustrates an example in which at least an X number of Gr candidates of the location and the device Gr="Gr1" to "GrX" are included as the candidates belonging to the location and device information 1230_1. Further, the example of 12b-1 in FIG. 12B indicates that each Gr candidate has a plurality of attributes ("floor", "room/zone", "location", "system", and "device"), and each attribute includes a plurality of candidates.

Specifically, in the case of the location and device information 1230_1, it is indicated that at least two candidates of "north building first floor" and "north building east side outdoors" are included as candidates belonging to "floor". Further, as candidates belonging to the "room/zone", it is indicated that at least four candidates of "grade 1 class 1", "grade 1 class 2", "home economics room", and "outdoor unit installation place" are included. Further, it is indicated that at least one candidate of "attic" is included as a candidate belonging to "location". Further, it is indicated that at least one candidate of "system A" is included as a candidate belonging to "system". Further, it is indicated that at least three candidates of "FFF001DD", "FFF002DD", and "RRR100F" are included as candidates belonging to "device".

Further, in an example of 12b-2 of FIG. 12B, one of the pieces of construction target information is process and operation information, and examples are

- the process and operation information 1240_1 linked to case name="α" and property name="AAA", and
- the process and operation information 1240_2 linked to case name="α" and property name="BBB".

Further, the example of 12b-2 of FIG. 12B indicates an example in which at least a Y number of Gr candidates of process and operation Gr="Gr1" to "GrY" are included as candidates belonging to the process and operation information 1240_1. Further, in the example of 12b-2 in FIG. 12B, each Gr candidate has a plurality of attributes ("process" and "operation"), and each attribute includes a plurality of candidates.

Specifically, in the case of the process and operation information 1240_1, it is indicated that at least two candidates of "construction work" and "test" are included as candidates belonging to "process". Further, it is indicated that at least four candidates of "install indoor unit", "refrigerant pipe laying", "water flow passing test", and "airtightness test" are included as candidates belonging to "operation".

Further, the example of 12c-1 in FIG. 12C illustrates an example in which one of the pieces of construction target information is imaging timing information 1250 and at least three candidates of "before operation", "during operation", and "after operation" are included as candidates belonging to the imaging timing information 1250.

Further, in the example of 12c-2 in FIG. 12C, one of the pieces of construction target information is the imaging person information, and an example of imaging person information 1260_1 linked to the constructor name="constructor P" and an example of imaging person information 1260_2 linked to the constructor name="constructor Q" are indicated. Further, the example of 12c-2 in FIG. 12C indicates that at least three candidates of imaging person names="i", "j", and "k" are included as candidates belonging to the imaging person information 1260_1.

Further, the example of 12c-3 in FIG. 12C illustrates an example in which one of the pieces of construction target information is evaluation information and at least two candidates of "OK" and "NG" are included as candidates belonging to evaluation information 1270.

Further, the example of 12c-4 in FIG. 12C illustrates an example in which one of the pieces of construction target information is imaging date and time information, and 12 candidates of months="1" to "12" and 31 candidates of days="1" to "31" are included as candidates belonging to imaging date and time information 1280.

Figure 13:
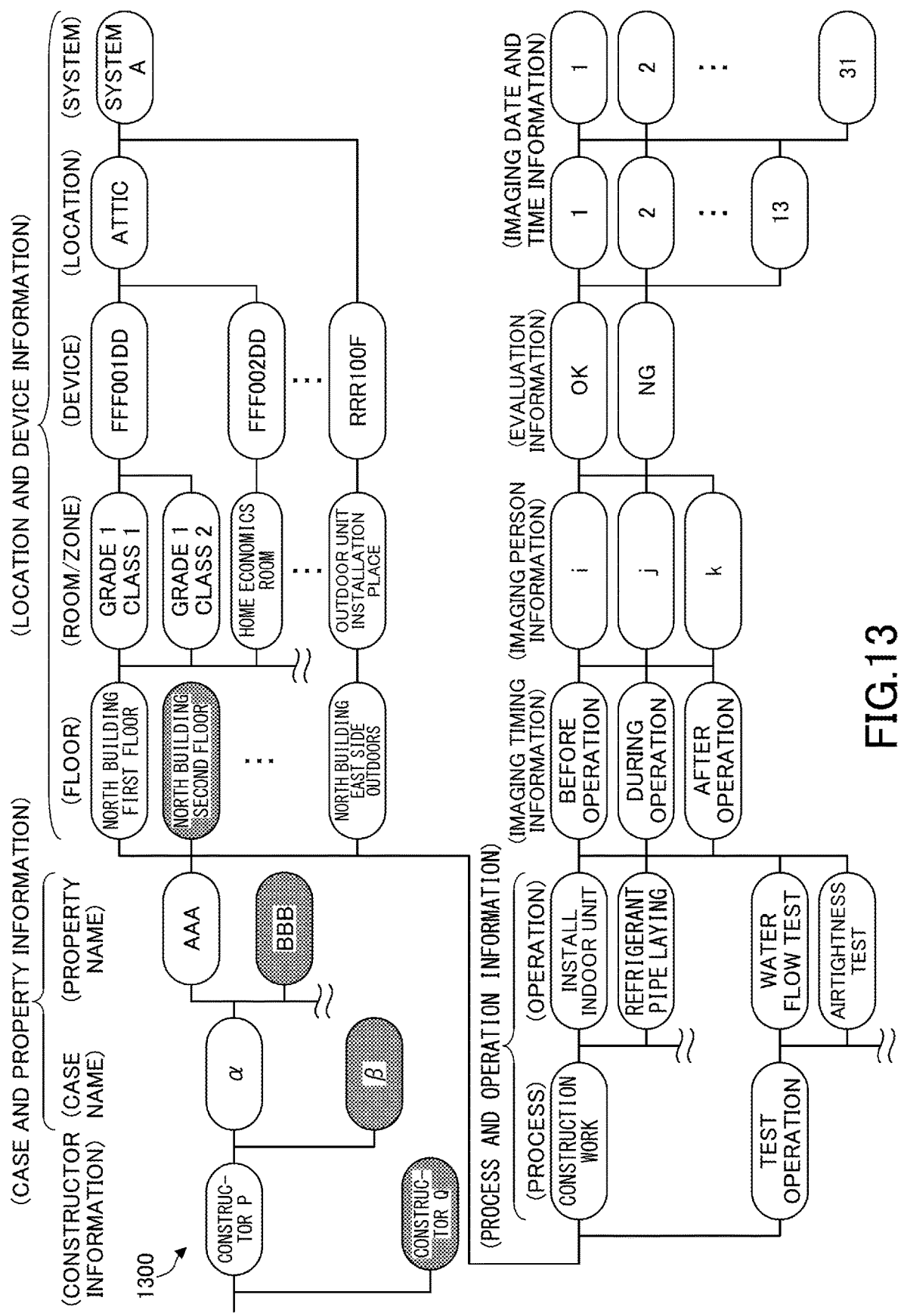
FIG. 13 is a diagram illustrating candidate linking information in an application example.

Next, candidate linking information in an application example will be described. FIG. 13 is a diagram illustrating candidate linking information in the application example. Specifically, the example of FIG. 13 illustrates candidate linking information 1300 generated by the candidate linking information generating unit 122 based on the eight pieces of construction target information illustrated in FIGS. 12A to 12C and registered in the candidate linking information storage unit 712. Further, in the example of FIG. 13, with respect to the case and property information 1220 among the pieces of construction target information, the linking between a plurality of candidates within the construction target information is further indicated. Further, in the example of FIG. 13, with respect to the location and device information 1230_1 and 1230_2 and the process and operation information 1240_1 and 1240_2 among the pieces of construction target information, the linking between the candidates included in each attribute is also illustrated.

In the candidate linking information 1300 in FIG. 13, a shaded candidate indicates that there is a candidate belonging to construction target information in a lower hierarchy than the construction target information to which the candidate belongs, but such a candidate is omitted as a matter of convenience of description.

Figure 14:
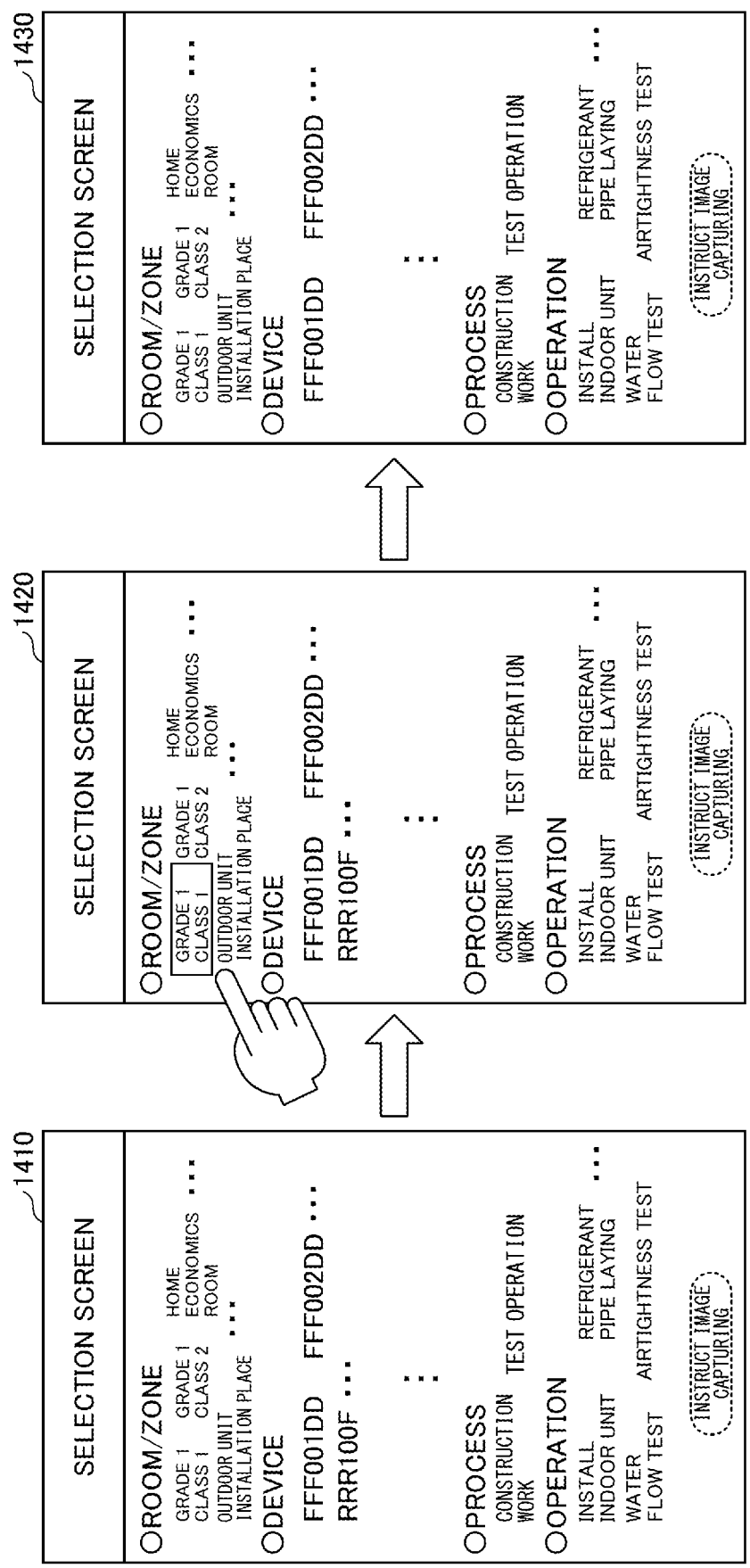
FIG. 14 is a first diagram illustrating a selection screen in an application example.
Figure 15:
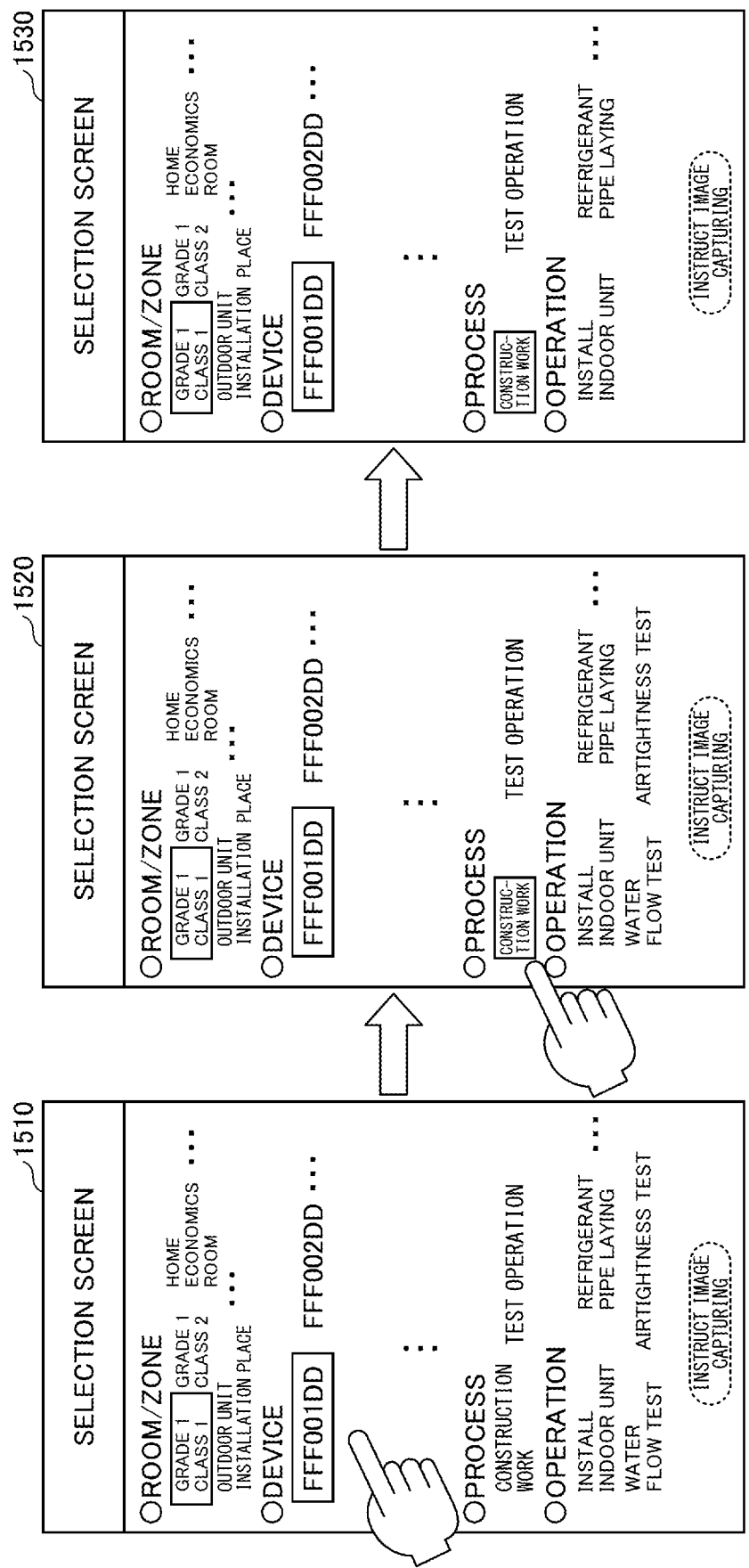
FIG. 15 is a second diagram illustrating a selection screen in an application example.

Next, a selection screen in the application example, which is generated based on the candidate linking information 1300, will be described. FIGS. 14 and 15 are first and second diagrams illustrating the selection screen in the application example. The examples of FIGS. 14 and 15 illustrate a part of the selection screen generated by the selection screen display unit 702 based on the linking between the candidates identified according to the candidate linking information 1300.

In FIG. 14, a selection screen 1410 is an initial selection screen in which the following are displayed. Among the pieces of construction target information, as candidates included in each attribute of the location and device information,
candidates included in "room/zone" and candidates included in "device" are displayed, and as candidates included in each attribute of the process and operation information,
candidates included in "process" and candidates included in "operation" are displayed.

As illustrated in FIG. 14, in a state in which the initial selection screen 1410 is displayed, it is assumed that the constructor 150 selects "grade 1 class 1" from among at least four candidates included in "room/zone". The selection screen 1420 indicates that the constructor 150 has selected "grade 1 class 1" from among at least four candidates included in "room/zone".

When "grade 1 class 1" is selected by the constructor 150, the selection screen display unit 702 refers to the candidate linking information 1300 and extracts candidates linked to "grade 1 class 1" from among at least three candidates included in "device".

According to the candidate linking information 1300, among at least four candidates included in "device", candidates linked to "grade 1 class 1" are "FFF001DD" and "FFF002DD". Therefore, as illustrated in the selection screen 1430, the selection screen display unit 702 displays only "FFF001DD" and "FFF002DD" as candidates included in "device".

Subsequently, the process proceeds to FIG. 15. In FIG. 15, a selection screen 1510 illustrates a state in which the constructor 150 selects "FFF001DD" from among two candidates included in "device" in a state in which the selection screen 1430 of FIG. 14 is displayed.

The selection screen 1520 indicates a state in which the constructor 150 has selected "construction work" from among two candidates included in "process". When "construction work" is selected by the constructor 150, the selection screen display unit 702 refers to the candidate linking information 1300 and extracts candidates linked to "construction work", from among at least four candidates included in "operation".

According to the candidate linking information 1300, among at least four candidates included in "operation", the candidates linked to "construction work" are "install indoor unit" and "refrigerant pipe laying". Therefore, as indicated in the selection screen 1530, the selection screen display unit 702 displays only "install indoor unit" and "refrigerant pipe laying" as candidates included in "operation".

Summary

As is clear from the above description, the terminal device 130 according to the first embodiment performs the following:
Display candidates belonging to each of a plurality of kinds of construction target information to be associated with captured image data when a constructor captures a construction photograph.
Receive a candidate selected by the constructor from among candidates belonging to each of the plurality of kinds of construction target information that are displayed.
Display a candidate linked to the selected candidate when a candidate is selected by the constructor.

In this way, each time a candidate belonging to construction target information is selected, candidates belonging to other construction target information are narrowed down, and a selection screen after the narrowing down is displayed. Thus, when inputting construction target information, a constructor does not need to select a candidate from among a large number of candidates. As a result, for example, it is possible to reduce the number of times of scrolling the selection screen, and thus it is possible to reduce the operation load of the constructor when inputting the construction target information at the construction site.

That is, according to the first embodiment, it is possible to provide a terminal device and a program that reduce the operation load at the construction site.

Second Embodiment

In the first embodiment, it has been described that the selection screen display unit 702 ends the selection screen display control process after the instruction of candidate selection is completed for the plurality of kinds of construction target information and the imaging device 428 is activated. Therefore, in the first embodiment, when taking the next construction photograph, the constructor 150 needs to give an instruction of candidate selection for a plurality of kinds of construction target information again.

However, when taking the next construction photograph, it may be sufficient to change the instruction of candidate selection only for some of the kinds of construction target information among the plurality of kinds of construction target information. In such a case, if it is required to give an instruction of candidate selection for all of the plurality of kinds of construction target information, the operation load at the construction site for the constructor will increase.

Therefore, in the second embodiment, in a case where the instruction of candidate selection is to be changed only for some of the kinds of construction target information, it is possible to give an instruction to redo the candidate selection for some of the kinds of the construction target information while maintaining the instruction of candidate selection for the other kinds of construction target information. Hereinafter, the second embodiment will be described focusing on differences from the first embodiment.

Selection Screen Display Control Process

Figure 16:
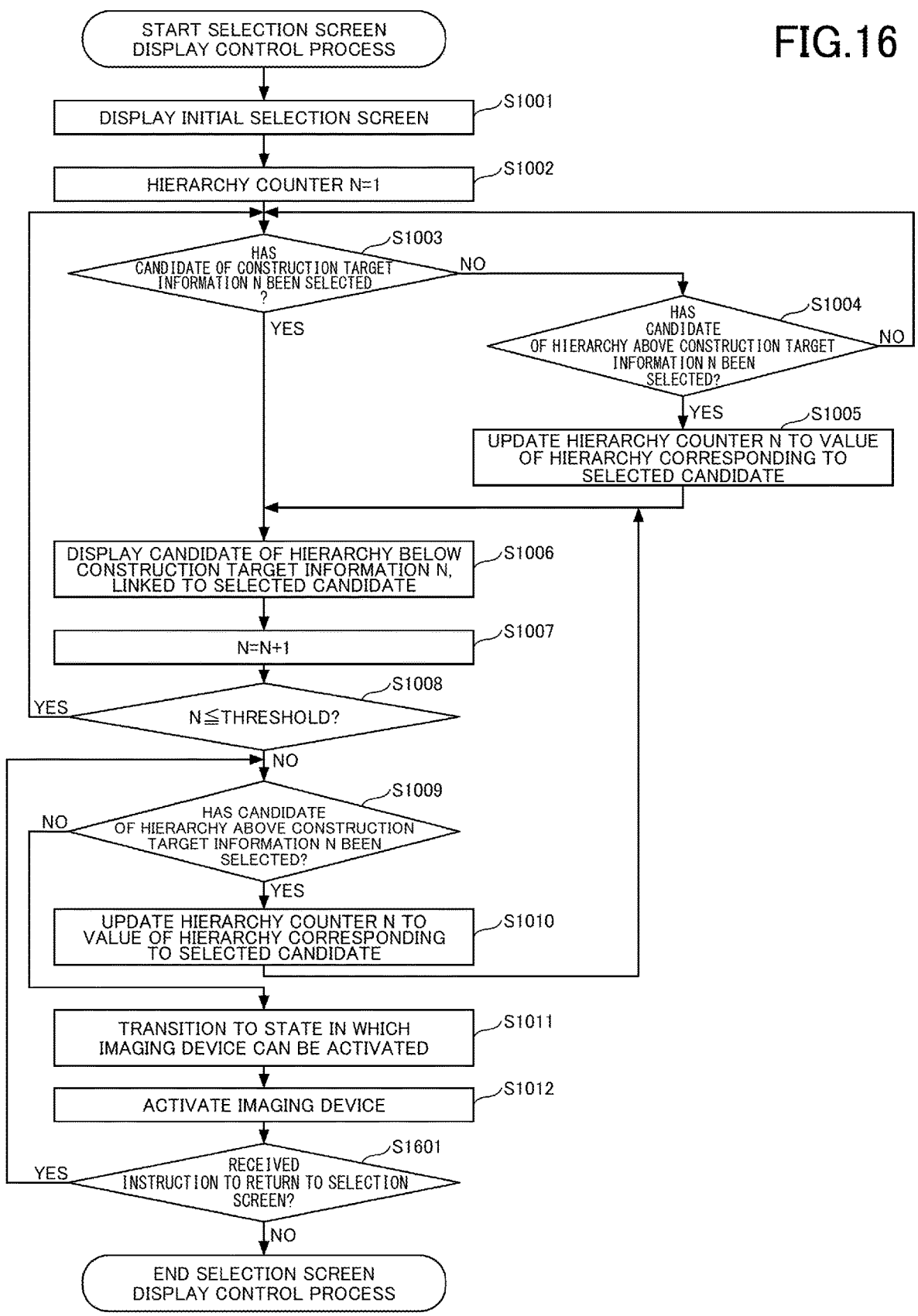
FIG. 16 is a second flowchart illustrating the flow of the selection screen display control process.

First, details of the selection screen display control process (step S307) by the selection screen display unit 702 of the terminal device 130 will be described. FIG. 16 is a second flowchart illustrating the flow of a selection screen providing process. The difference from the selection screen display control process illustrated in FIG. 10 is step S1601.

In step S1011, it becomes possible to press the imaging instruction button 940. In step S1012, when the constructor 150 presses the imaging instruction button 940, the imaging device 428 is activated in the terminal device 130. A case will be described in which, in this state, the constructor 150 takes a construction photograph, and after the capturing is completed, the next construction photograph is taken after an instruction of candidate selection is changed for some of the kinds of construction target information. In this case, the constructor 150 inputs an instruction to return to the selection screen.

Therefore, in step S1601, the selection screen display unit 702 determines whether an instruction to return to the selection screen is input by the constructor 150. When it is determined in step S1601 that such an input has been made (YES in step S1601), the process returns to step S1009.

At this time, the selection screen display unit 702 displays a selection screen in which a state in which an instruction of candidate selection has been completed for the plurality of kinds of construction target information is retained, and each candidate is retained in a selectable manner for the plurality of kinds of construction target information. Thus, the constructor 150 can start giving an instruction of candidate selection, starting from the construction target information of any hierarchy.

In this case, the already selected candidate is maintained for the hierarchy higher than the construction target information for which the instruction of candidate selection is given, and it is sufficient for the constructor 150 to give an instruction of candidate selection for the construction target information of the hierarchy lower than the construction target information for which the instruction of candidate selection is given.

Display Example of Selection Screen

Next, a display example of the selection screen will be described. FIG. 17 is a third diagram illustrating a display example of the selection screen. In FIG. 17, a selection screen 1710 is displayed when the constructor 150 inputs an instruction to return to the selection screen after the imaging device 428 is activated. As illustrated in FIG. 17, a selection screen is displayed in which a state in which an instruction of candidate selection has been completed for a plurality of kinds of construction target information is maintained, and candidates for the plurality of kinds of construction target information are retained in a selectable manner.

Specifically, in the displayed selection screen,
  a state in which "candidate 1_1" is selected from among the three candidates belonging to the construction target information (1) is retained, and the three candidates belonging to the construction target information (1) are retained in a selectable manner,
  a state in which "candidate 2_2" is selected from among the three candidates belonging to the construction target information (2) is retained, and the three candidates belonging to the construction target information (2) are retained in a selectable manner, and
  a state in which "candidate 3_2" is selected from among the two candidates belonging to the construction target information (3) is retained, and the two candidates belonging to the construction target information (3) are retained in a selectable manner.

In such a state, for example, it is assumed that the constructor 150 has changed the instruction of candidate selection for the construction target information (2), from "candidate 2_2" to "candidate 2_3". In FIG. 17, the selection screen 1720 illustrates a state in which the constructor 150 has changed the instruction of candidate selection for the construction target information (2) to "candidate 2_3".

When "candidate 2_3" is selected by the constructor 150, the selection screen display unit 702 refers to the candidate linking information 600, and extracts candidates linked to "candidate 2_3" from among 11 candidates belonging to the construction target information (3).

According to the candidate linking information 600, among the 11 candidates belonging to the construction target information (3), the candidate linked to "candidate 2_3" is only "candidate 3_4". Therefore, as indicated in the selection screen 1730, the selection screen display unit 702 displays only "candidate 3_4" as a candidate belonging to the construction target information (3).

As illustrated in the selection screen 1730, when only one candidate is displayed as a candidate belonging to the construction target information (3), the selection screen display unit 702 may allow the imaging instruction button 940 to be pressed before the one candidate is selected. Then, when the imaging instruction button 940 is pressed by the constructor 150, the one candidate (here, "candidate 3_4") may also be in a selected state. Accordingly, the selection screen display unit 702 can report, to the imaging control unit 705, the candidate (including "candidate 3_4") selected for each of the plurality of kinds of construction target information, and instruct the imaging control unit 705 to activate the imaging device 428.

Summary

As is clear from the above description, the terminal device 130 according to the second embodiment further performs the following, in addition to the functions described in the first embodiment.

In a case where an instruction to return to the selection screen is input after the imaging device is activated and a construction photograph is captured, a selection screen in which a state before the imaging device is activated and in which an instruction of candidate selection is completed is maintained, is displayed.

In a case where the instruction of candidate selection is changed, with respect to a hierarchy lower than the construction target information to which the changed candidate belongs, candidates linked to the changed candidate are displayed.

In this way, by adopting a configuration in which an instruction of candidate selection is started from construction target information of any hierarchy after the capturing of a construction photograph is performed, it becomes unnecessary for a constructor to give an instruction of candidate selection for all of a plurality of kinds of construction target information. As a result, it is possible to reduce the operation load of the constructor when inputting the construction target information at a construction site.

That is, according to the second embodiment, it is possible to provide a terminal device and a program which further reduce an operation load at a construction site.

Other Embodiments

In the above embodiments, the selection screen display unit 702 is disposed in the terminal device 130, but the selection screen display unit 702 may be disposed in the server apparatus 120. In this case, the terminal device 130 transmits an instruction of candidate selection to the server apparatus 120 every time an instruction of candidate selection is input for the construction target information. Accordingly, the terminal device 130 can display a selection screen, by receiving, from the server apparatus 120, the selection screen generated by the selection screen display unit disposed in the server apparatus 120.

In the above embodiments, the candidate linking information generating unit 122 automatically generates the candidate linking information based on the construction target information. However, the candidate linking information may be manually generated and registered by the business operator 160, for example.

Further, in each of the above-described embodiments, even in a case where the constructor selects one candidate from among a plurality of candidates belonging to the construction target information, the display of candidates other than the one candidate is maintained. However, candidates other than the one candidate selected by the constructor may be hidden.

While embodiments have been described, it will be understood that various changes in form and detail may be made therein without departing from the spirit and scope of the claims.

The present application is based on and claims priority to Japanese Priority Application No. 2020-035934, filed on Mar. 3, 2020, the entire contents of which are hereby incorporated herein by reference.

REFERENCE SIGNS LIST

100: construction photograph collection system
110: information input apparatus
120: server apparatus
121: construction target information acquiring unit
122: candidate linking information generating unit
123: selection screen information transmitting unit
124: captured image data acquiring unit
600: candidate linking information
701: selection screen information acquiring unit
702: selection screen display unit
703: selection instruction receiving unit
704: imaging instruction acquiring unit
705: imaging control unit
1300: candidate linking information

The invention claimed is:

1. A terminal device configured to capture an image of a construction status of a device installed at a plurality of locations, the terminal device comprising:
a memory; and
a processor coupled to the memory and configured to:
receive, from a user of the terminal device, a selection instruction to select construction target information to be associated with the image to be captured among a plurality of candidates for the construction target information, each candidate belonging to one of a plurality of types of information, the plurality of types of information including at least two types of information among information relating to a case, a property, a constructor, an imaging person, a location, a device, operation content, operation progress, evaluation of operation, and imaging date and time, wherein the selecting construction target information is performed by:
presenting, to the user, a first set of candidates of the plurality of candidates categorized by one of the plurality of types of information,
selecting, in response to the selection instruction from the user, a first candidate as information to be associated with the image from among the presented first set of candidates,
after the first candidate is selected, identifying a second set of candidates categorized by one of the plurality of types of information, the second set of candidates being associated with the selected first candidate and belonging to a different type of information than the type of information of the selected first candidate,
presenting, to the user, the second set of candidates, and selecting, in response to the selection instruction from the user, a second candidate as information associated with the image from among the presented second set of candidates; wherein the processor is further configured to:
upon completion of the selection of construction target information, in response to a capture instruction to capture the image from the user of the terminal device, capture the image; and after capturing the image, present, to the user, at least one of the selected first candidate or the selected second candidate.

2. The terminal device according to claim 1, wherein the processor is further configured to:

register linking information relating to linking between the candidates based on the plurality of types of information.

3. The terminal device according to claim 1, wherein the processor is further configured to:

acquire linking information relating to linking between the candidates based on the plurality of types of information, and in response to the selection instruction from the user, select the first candidate as information to be associated with the image from among the presented first set of candidates, after the first candidate is selected, identifying the second set of candidates based on the linking information, and presenting, to the user, the second set of candidates.

4. The terminal device according to claim 1, wherein in an imaging standby state before receiving the instruction to capture the image from the user of the terminal device, the processor is configured to present, to the user, the construction target information.

5. The terminal device according to claim 1, wherein in a state where one candidate is presented for each of the plurality of types of information, in response to receiving the capture instruction to capture the image from the user of the terminal device, the processor is configured to select the one candidate presented for each of the plurality of types of information.

6. The terminal device according to claim 1, wherein upon completion of the selection of construction target information, in response to the capture instruction to capture the image from the user of the terminal device, the processor is configured to capture the image and associate the captured image with the selected first candidate or the selected second candidate.

7. A non-transitory computer-readable recording medium storing a program that causes a computer to execute a process performed in a terminal device including an imaging unit configured to capture an image of a construction status of a device installed at a plurality of locations, the process comprising:

receiving, from a user of the terminal device, a selection instruction to select construction target information to be associated with the image to be captured among a plurality of candidates for the construction target information, each candidate belonging to one of a plurality of types of information, the plurality of types of information including at least two types of information among information relating to a case, a property, a constructor, an imaging person, a location, a device, operation content, operation progress, evaluation of operation, and imaging date and time, wherein the selecting construction target information is performed by:

presenting, to the user, a first set of candidates of the plurality of candidates categorized by one of the plurality of types of information, and selecting, in response to the selection instruction from the user, a first candidate as information to be associated with the image from among the presented first set of candidates, after the first candidate is selected, identifying a second set of candidates categorized by one of the plurality of types of information, the second set of candidates being associated with the selected first candidate and belonging to a different type of information than the type of the information of the selected first candidate, presenting, to the user, the second set of candidates, and selecting, in response to the selection instruction from the user, a second candidate as information associated with the image from among the presented second set of candidates; wherein the processor is further configured to:

upon completion of the selection of construction target information, in response to a capture instruction to capture the image from the user of the terminal device, capture the image; and after capturing the image, present, to the user, at least one of the selected first candidate or the selected second candidate.

* * * * *